United States Patent [19]

Arnost et al.

[11] Patent Number: 5,716,754
[45] Date of Patent: Feb. 10, 1998

[54] IMAGE-RECORDING MATERIALS

[75] Inventors: Michael J. Arnost, North Andover; Peter Viski; David P. Waller, both of Lexington; David C. Whritenour, Franklin, all of Mass.

[73] Assignee: Polaroid Corporation, Cambridge, Mass.

[21] Appl. No.: 715,451

[22] Filed: Sep. 18, 1996

[51] Int. Cl.$^6$ ................. G03C 8/10; G03C 8/14; G03C 8/20; G03C 8/12

[52] U.S. Cl. ............... 430/200; 430/203; 430/222; 430/223; 430/225; 430/226; 430/241; 430/562; 534/778

[58] Field of Search ................... 430/203, 222, 430/223, 225, 226, 562, 200, 241; 534/778

[56] References Cited

U.S. PATENT DOCUMENTS

| | | | |
|---|---|---|---|
| 3,415,644 | 12/1968 | Land | 430/212 |
| 3,719,489 | 3/1973 | Cieciuch et al. | 430/222 |
| 3,942,987 | 3/1976 | Landholm et al. | 430/223 |
| 4,098,783 | 7/1978 | Cieciuch et al. | 260/147 |
| 4,268,625 | 5/1981 | Fujita et al. | 430/562 |
| 4,273,708 | 6/1981 | Kilminster et al. | 260/199 |
| 4,374,767 | 2/1983 | Weaver et al. | 260/158 |
| 4,374,768 | 2/1983 | Fleischer et al. | 260/158 |
| 4,524,124 | 6/1985 | Bergthaller et al. | 430/222 |
| 4,529,692 | 7/1985 | Ono et al. | 430/223 |
| 4,556,632 | 12/1985 | Sato et al. | 430/562 |
| 4,698,651 | 10/1987 | Moore et al. | 503/227 |
| 5,037,731 | 8/1991 | Vetter et al. | 430/222 |
| 5,223,387 | 6/1993 | Tsukase et al. | 430/562 |
| 5,316,887 | 5/1994 | Arnost et al. | 430/203 |
| 5,436,108 | 7/1995 | Freedman et al. | 430/200 |
| 5,658,705 | 8/1997 | Viski et al. | 430/222 |

*Primary Examiner*—Richard L. Schilling
*Attorney, Agent, or Firm*—Jennifer A. Kispert

[57] ABSTRACT

There are described image-recording materials which include an image dye-providing compound comprising a novel naphthol azo cyan dye having a 3-aminobenzoisothiazole moiety. The image dye-providing compound includes a diffusion control moiety such as a hydroquinonyl developer group, a precursor thereof or a thiazolidine moiety and, may be diffusible or nondiffusible as a function of the diffusion control moiety.

Image-recording materials according to the invention including those which contain high potential developers such as aminoreductone allow sufficient cyan chromophore to diffuse to the image-receiving layer to provide an acceptable photograph and result in no appreciable reduction of the 3-aminobenzoisothiazole moiety of the novel naphthol azo cyan dye.

21 Claims, No Drawings

IMAGE-RECORDING MATERIALS

This invention relates to image-recording materials which include novel image dye-providing compounds.

BACKGROUND OF THE INVENTION

Generally, the diazo moiety of an azo cyan dye is strongly electron deficient so that the $\lambda_{max}$ of the cyan dye is at the desired wavelength for a particular application, e.g., image dye-providing materials as described in, for example, U.S. Pat. Nos. 3,942,987; 4,268,625; 4,273,708; 4,556,632; and 5,223,387.

The naphthol azo cyan dyes used in image dye-providing materials as described in aforementioned U.S. Pat. Nos. 3,942,987; 4,268,625; and 4,273,708 have a nitro group in the para position of the aryldiazo moiety of the dye. The nitro group is subject to reduction during photographic development, particularly when included in those systems utilizing higher potential developers such as aminoreductone or p-butoxyphenidone.

Reduction of the nitro group results in undesirable discoloration of the resultant photographic image. Hence, in some photographic systems, it would be desirable to use an electron withdrawing group other than a nitro group to render the diazo moiety strongly electron deficient. For example, cyano- or alkyl sulfonyl-substituted aryl groups remain stable in the presence of higher potential developers, as described in aforementioned U.S. Pat. Nos. 4,556,632 and 5,223,387.

However, while the electron withdrawing groups of the diazo moiety of the naphthol azo cyan dyes described in aforementioned U.S. Pat. Nos. 4,556,632 and 5,223,387 resist reduction in higher potential developers, they do not provide a naphthol azo cyan dye of suitable wavelength for use in all photographic systems, e.g., a longer wavelength range absorption is desirable when using o-sulfamoyl-substituted naphthols.

There are known in the art disclosures wherein isothiazole moieties are used as the diazo moiety of an azo dye, for example, as disclosed in U.S. Pat. Nos. 4,374,767; 4,374,768; and 4,698,651.

As the state of the art advances, novel approaches continue to be sought in order to attain the required performance criteria for these photographic systems. Accordingly, the present invention relates to image-recording materials which include novel image dye-providing compounds.

It is therefore the object of this invention to provide novel image-recording materials.

It is another object of this invention to provide novel image dye-providing compounds which are useful in photography, for example, in dye release diffusion transfer processes such as redox dye release or silver-assisted dye release.

SUMMARY OF THE INVENTION

These and other objects and advantages are accomplished in accordance with the invention by providing image-recording materials which include novel image dye-providing compounds represented by formula (I)

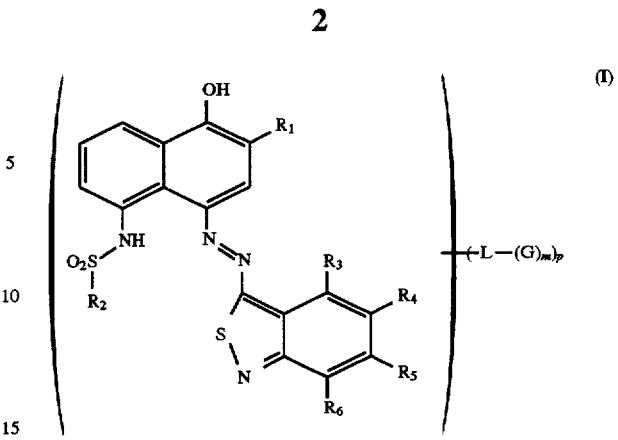

wherein:

G is a diffusion control moiety such as a hydroquinonyl group, a precursor thereof or a thiazolidine moiety;

m is 1, or preferably, 2;

L is a covalent bond or a divalent linking group;

p is 1, 2 or 3; preferably, p is 1;

$R_1$ is:

(1) $SO_2NR_7R_8$ wherein $R_7$ and $R_8$ are independently hydrogen; linear or branched alkyl ($C_nH_{2n+1}$) wherein n is an integer from 1 to 6; alkyl substituted with a photographically-acceptable substituent such as (a) hydroxy, (b) alkoxy having from 1 to 6 carbon atoms, (c) halogen, (d) sulfamoyl such as

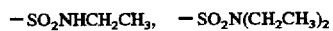

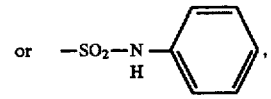

(e) sulfonamido such as

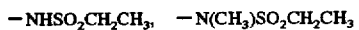

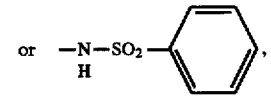

(f) carboxy, (g) carbamoyl such as

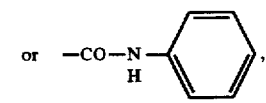

(h) carboxamido such as

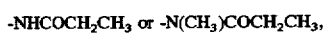

(i) carboxylic ester such as

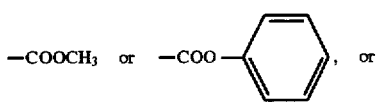

(j) sulfo;

cycloalkyl such as cyclohexane; benzyl; phenyl; phenyl substituted with a photographically-acceptable substituent such as described in (1)(a)–(1)(d) and (1)(f)–(1)(j); a heterocyclic group such as furan, pyridine or triazine; a heterocyclic group substituted with alkyl having from 1 to 6 carbon atoms or a photographically-acceptable substituent such as described in (1)(d), (1)(f)–(1)(g) or (1)(i)–(1)(j) or; taken together, along with the nitrogen atom to which they are attached, form a 5- or 6-membered ring such as morpholino or piperidino; or, taken together, are -(L-(G)$_m$); or (2) R$_9$NCOR$_{10}$ wherein R$_9$ is hydrogen; alkyl having from 1 to 6 carbon atoms; or, alkyl substituted with a photographically-acceptable substituent such as alkoxy having from 1 to 4 carbon atoms or as described in (1)(a) or; and R$_{10}$ is hydrogen; alkyl having from 1 to 6 carbon atoms; alkyl substituted with a photographically-acceptable substituent such as described in (1)(a)–(1)(j); cycloalkyl such as cyclohexane; benzyl; phenyl; phenyl substituted with a photographically-acceptable substituent such as described in (1)(a)–(1)(d) or (1)(f)–(1)(j); a heterocyclic group such as furan, pyridine or triazine; a heterocyclic group substituted with a photographically-acceptable substituent such as alkyl having from 1 to 6 carbon atoms or as described in (1)(d), (1)(f)–(1)(g) or (1)(i)–(1)(j); or, -(L-(G)$_m$); and R$_2$ is alkyl having from 1 to 6 carbon atoms; alkyl substituted with a photographically-acceptable substituent such as described in (1)(a)–(1)(j); benzyl; phenyl; phenyl substituted with a photographically-acceptable substituent such as described in (1)(a)–(1)(d) or (1)(f)–(1)(j); or, -(L-(G)$_m$); and R$_3$, R$_5$ and R$_6$ are independently hydrogen; as described in (1)(c); alkyl having from 1 to 4 carbon atoms; or, -(L-(G)$_m$); and R$_4$ is hydrogen; alkyl having from 1 to 4 carbon atoms; halogen; sulfamoyl such as described in (1)(d); carboxy; carbamoyl such as described in (1)(g); carboxylic ester such as described in (1)(i); sulfo; alkylsulfonyl; phenylsulfonyl; or, -(L-(G)$_m$); provided that at least one of R$_7$ and R$_8$, R$_{10}$, R$_2$ to R$_6$ is -(L-(G)$_m$).

Preferably, at least one of R$_2$, R$_4$, R$_7$ and R$_8$, or R$_{10}$ is -(L-(G)$_m$).

It will be understood from formula (I) that -(L-(G)$_m$) may be attached to the dye chromophore in any of the available positions such as R$_2$, R$_4$, or, R$_2$ and R$_4$, as illustrated by formulae (7), (5) and (1), respectively. Preferably, -(L-(G)$_m$) is attached to the dye chromophore at R$_1$ as specifically described below, R$_2$ or R$_4$.

The image dye-providing materials may be initially diffusible or nondiffusible as a function of the diffusion control moiety and generally may be characterized as either (1) initially soluble or diffusible in the processing composition but which are selectively rendered nondiffusible imagewise as a function of development or (2) initially insoluble or nondiffusible in the processing composition but which selectively provide a diffusible product imagewise as a function of development. The image dye-providing compounds may be complete dyes or dye intermediates, e.g., color couplers. The requisite differential in mobility or solubility may, for example, be obtained by a chemical reaction such as a redox reaction, a coupling reaction or a cleavage reaction.

A preferred diffusion control moiety is a 1,3-sulfur-nitrogen moiety. It is well known in the art that 1,3-sulfur-nitrogen compounds including the thiazolidines described above for use as diffusion control moieties are capable of undergoing cleavage in the presence of silver ions made available imagewise during the processing of a silver halide emulsion to liberate a photographically useful group, e.g., a dye, in an imagewise distribution corresponding to that of said silver ions. For example, in embodiments of the present invention wherein the diffusion control moiety of the image dye-providing compound is a thiazolidine, the image dye-providing compound is substantially non-diffusible in the photographic processing composition but capable of undergoing the above-described silver ion-assisted cleavage to liberate the more mobile and diffusible dye.

The image-recording materials of the present invention may be used in photographic, photothermographic and thermographic diffusion transfer photographic systems utilizing various film configurations, e.g., peel-apart or integral. The image-recording materials generally comprise one or more supports and carded by a support: a source of silver ions, an image dye-providing compound according to formula (I) and an image-receiving layer.

In a preferred embodiment of the present invention the image-recording materials comprise a photosensitive element comprising a support carrying a red-sensitive silver halide emulsion layer; a second sheet-like element which is superposed or superposable on said photosensitive element; an image-receiving layer positioned in one of said photosensitive or second sheet-like elements; an image dye-providing compound according to formula (I) and a means for providing an aqueous alkaline processing composition for initiating development of said red-sensitive silver halide emulsion after photoexposure to form an image on said image-receiving layer. The image-recording materials in other preferred embodiments of the present invention include additional layers, e.g., a green-sensitive silver halide emulsion layer having a magenta image dye-providing compound associated therewith, a blue-sensitive silver halide emulsion layer having a yellow image dye-providing compound associated therewith, a timing layer, a polymeric acid-reacting layer or a strip-coat layer.

Preferred photothermographic image-recording materials of the present invention which are useful in the thermal development of a silver halide latent image comprise one or more supports and carried by a support: a photosensitive silver halide emulsion which is preferably red-sensitive silver halide emulsion, a reducing agent, a binder which is preferably gelatin, an image dye-providing compound according to formula (I), an image-receiving layer and one of (a), (b), (c) or (d):

(a) a base-releasing precursor;

(b) a base-releasing precursor and a silver salt oxidizer;

(c) a thermal solvent; or (d) a silver salt oxidizer and a thermal solvent.

A preferred thermographic image-recording material of the present invention comprises one or more supports and carded by a support: a silver salt oxidizer, a thermal solvent, a binder which is preferably gelatin, an image dye-providing compound according to formula (I) and an image-receiving layer.

The use of a more reduction-resistant electron withdrawing moiety, i.e., the 3-aminobenzoisothiazole, as the diazo moiety of the subject dye versus a less reduction-resistant electron withdrawing group such as a nitro group in the para position of the aryldiazo moiety of an azo cyan dye enables the novel naphthol azo cyan chromophore to be stable in higher potential developers thus precluding the detrimental color shift attributed to the reduction of the, e.g., nitro group. In addition, the use of the 3-aminobenzoisothiazole as the diazo moiety of the subject dye renders the diazo moiety strongly electron deficient, resulting in the $\lambda_{max}$ of the subject cyan dye being at the desired wavelength, specifically, from about 640 to about 665 nm.

Photographic images derived from image-recording materials of the present invention are relatively lightfast, reductively stable, i.e., do not exhibit an appreciable hypsochromic shift in the presence of high potential photographic developers such as aminoreductone and butoxyphenidone and, exhibit a minimal absorption in the green and blue spectral regions which result in excellent hue characteristics.

These and other objects and advantages which are provided in accordance with the invention will in part be obvious and in part be described hereinafter in conjunction with the detailed description of various preferred embodiments of the invention. The invention accordingly comprises the processes involving the several steps and relation and order of one or more of such steps with respect to each of the others, and the product and compositions possessing the features, properties and relation of elements which are exemplified in the following detailed disclosure, and the scope of the application of which will be indicated in the claims.

For a fuller understanding of the nature and objects of the invention, reference should be had to the following detailed description of the preferred embodiments.

DETAILED DESCRIPTION OF THE PREFERRED EMBODIMENTS

The image-recording materials of the present invention may be used to form a color image by transferring the dyes or their precursors, e.g., dye developers, to an image-receiving layer as a function of development.

Any suitable diffusion control moiety may be used in the image-recording materials of the present invention. Illustrative examples of diffusion control moieties useful in the present invention include those which provide an imagewise pattern of a diffusible image-forming material by non-competitive (or sequential) chemical reactions and those which do so by competitive (or parallel) chemical reactions. Non-competitive (or sequential) chemical reactions are those wherein a chemical species formed in one reaction takes part in a second following reaction. Examples of such sequential chemical reactions are coupler-based systems wherein the oxidized diffusion control moiety, i.e., developer, which is the product of the development reaction, then reacts to form or release the dye image. A system of this type is described, for example, in U.S. Pat. No. 3,928,312.

Additional examples of this type of system and other cleavage reactions caused by the products of development are described by C. C. Van De Sande, Angew. Chem. Int. Ed. Eng., 22, 1983, 191–209.

Preferably, the diffusion control moiety utilizes a competitive (or parallel) chemical reaction. By a "competitive (or parallel) chemical reaction" is meant a chemical reaction wherein a single species such as a silver salt or a reducing agent takes part in two or more reactions which occur simultaneously during the imaging process. Hence there are two or more parallel reaction paths existing (or competing) at the same time for the single chemical species. These competing reactions provide an imagewise distribution of the single species which results in image discrimination. A specific example is where a single chemical species takes part in both the development reaction of silver halide or soluble silver ion or soluble silver ion-containing species and in the reaction that controls the formation or transfer of the imaging material such as an image dye-providing compound.

Examples of suitable diffusion control moieties which utilize competitive (or parallel) chemical reactions are:

(1) $Ag^+$ catalyzed dye release reactions as described in: U.S. Pat. Nos. 3,719,488, 3,719,489, 4,060,417, 4,098,783; U.K. Pat. Appln. 1243 046; commonly-assigned U.S. patent application Ser. No. 08/556,534, filed Nov. 13, 1995 now U.S. Pat. No. 5,569,574 and in commonly-assigned U.S. patent application Ser. No. 607,296 filed on Feb. 26, 1996 now abandoned in favor of copending, commonly assigned U.S. patent application Ser. No. 08/754,286 filed on Nov. 20, 1996. $Ag^+$ is involved in both the development and dye release reactions occurring simultaneously. $Ag^+$ is involved in the dye release reaction or consumed by the development reaction with exposed silver halide;

(2) $Ag^+$ complexation and immobilization of dyes as described in U.S. Pat. No. 3,443,941. $Ag^+$ is either developed or complexes with dye molecules to yield a negative image. $Ag^+$ complexes with and immobilizes dyes or is consumed by reaction with exposed silver halide;

(3) pH-controlled diffusion of image dyes as described in U.K. Pat. Appln. 860 234 in which mobile dyes are made immobile by alkali consumption. Herein, alkali ($OH^-$) is consumed in both making dyes diffusible and in the development reaction. Hydroxide anion makes dyes soluble and mobile or is consumed by the development reaction with exposed silver halide;

(4) Dye-developer systems as described in U.S. Pat. No. 2,983,606 and coupler-developers as described in Jap. Pat. 80-07 578 and DE 2 334 035 in which mobile dye species or dye forming species either transfer or are immobilized (consumed) by reaction with exposed silver halide;

(5) Systems wherein a nondiffusible image forming compound does not release a dye or dye precursor by itself but rather releases a dye or dye precursor upon reaction with a reducing agent. In this case, a compound which mediates a redox reaction, i.e., an electron donor, is generally used in combination.

(6) Systems wherein diffusible dyes are released by the action of alkali with ballasted compounds and the reduction of the ballasted compounds prevents release. Such systems are described in U.S. Pat. Nos. 4,199,354 and 4,199,355; and German Pat. Nos. 2,543,902 and 2,645,656; U.S. Pat. No. 4,139,389 describes a cyclization-based cleavage and European Patent Applications 0 004 399 and 0 038 092 and U.K. Pat. Appln. 11445 describe quinone methide reduction. In these schemes $Ag^+$ and the ballasted dye releaser compete for developer prior to alkali attack. Developer molecules reduce the dye releaser and form a diffusible dye or are consumed by the development reaction with exposed silver halide;

(7) Electron transfer-induced release of dye as described in DE 3 008 588; U.S. Pat. Nos. 4,343,893, 4,450,223, 4,609,610 and 4,619,884; and EP 0 220 746. In these mechanisms there is competition between the $Ag^+$ and the immobile dye releasers for the electron transfer material, i.e., the developer. ETA molecules react with the dye releaser to form a diffusible dye or are consumed by the development reaction with exposed silver halide. This process is commonly known as "ROSET" process; and (8) Dye-bleaching imaging systems as described in DE 2 907 435, DE 2 907 437, DE 2 907 440, DE 2 907 436 and U.K. 2 043 282. In these systems there is competition for the silver halide developer material by $Ag^+$ and the cleavable, image dye-releasing material.

Compounds within the scope of formula (I) include those which are capable of forming a diffusible color image in reverse correspondence with development of silver halide, e.g., color-developing agents comprising a combination of a hydroquinone developing agent and a dye component as described in U.S. Pat. Nos. 3,134,764; 3,362,819; 3,482,972; 3,544,545; and 3,597,200; non-diffusible compounds which may release a diffusible dye under an alkaline condition but which lose the capacity when reacted with a silver halide as described in U.S. Pat. No. 4,503,137; or, non-diffusible compounds capable of reacting with a reducing agent which remains without being oxidized by development to release a diffusible dye as described in U.S. Pat. Nos. 4,559,290 and 4,783,396.

Further, compounds within the scope of formula (I) include those which are capable of forming a diffusible color image in correspondence with development of silver halide, e.g., compounds known as DRR couplers which have a diffusible dye as the releasing group and release the diffusible dye by reaction with an oxidation product of a reducing agent as described in U.S. Pat. Nos. 3,443,940; 4,474,877; and 4,483,914; or, compounds known as DRR compounds which can reduce silver halides and organic silver salts and which release a diffusible dye after reducing the halides or salts.

Illustrative examples of the image dye-providing compounds of the present invention within the scope of formula (I) wherein G is a hydroquinonyl silver halide developer group are represented by formulae (1) and (2):

As stated earlier, any suitable linking group may be used in the image dye-providing compounds of the invention. In a preferred embodiment, L is a divalent linking group, such as

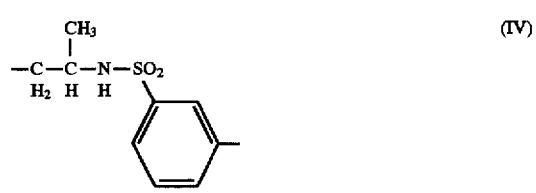

In particularly preferred embodiments, L is the divalent linking group as disclosed and claimed in copending, commonly-assigned U.S. patent application Ser. No. 08/607, 296, filed on Feb. 26, 1996, now abandoned.

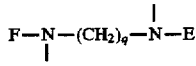
(VI)

wherein: q is 2, 3 or 4; and E and F are independently: hydrogen or

In a preferred embodiment q is 3.

In particularly preferred embodiments, $R_1$ is $SO_2NR_7R_8$ wherein $R_7$ and $R_8$, taken together, are $-(L-(G)_m)$ wherein L is a divalent linking group, the diffusion control moiety G is a 1,3-sulfur-nitrogen moiety, preferably a thiazolidine moiety, and m is 2.

In particularly preferred embodiments, the diffusion control moiety G is a thiazolidine moiety represented by formula (VIII)

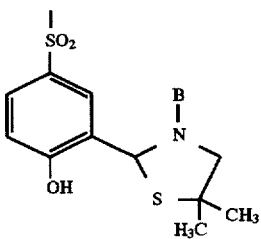
(VIII)

wherein B is a ballast group such as an alkyl group having from 10 to 22 carbon atoms, preferably, $C_{18}H_{37}$, or a phenyl ring with an attached alkyl group having from 8 to 22 carbon atoms.

Illustrative examples of image dye-providing compounds of the present invention within the scope of formula (I) wherein m is 1 and diffusion control moiety G is the preferred thiazolidine moiety of formula (VIII) wherein B is $C_{18}H_{37}$ are represented by formulae (3) and (4):

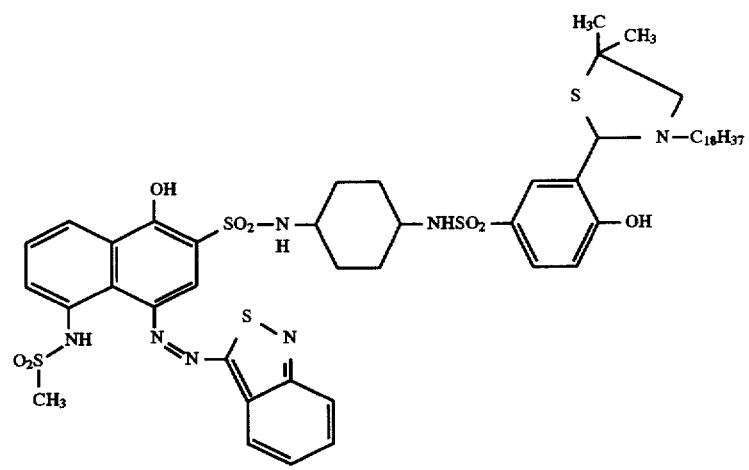
(3)

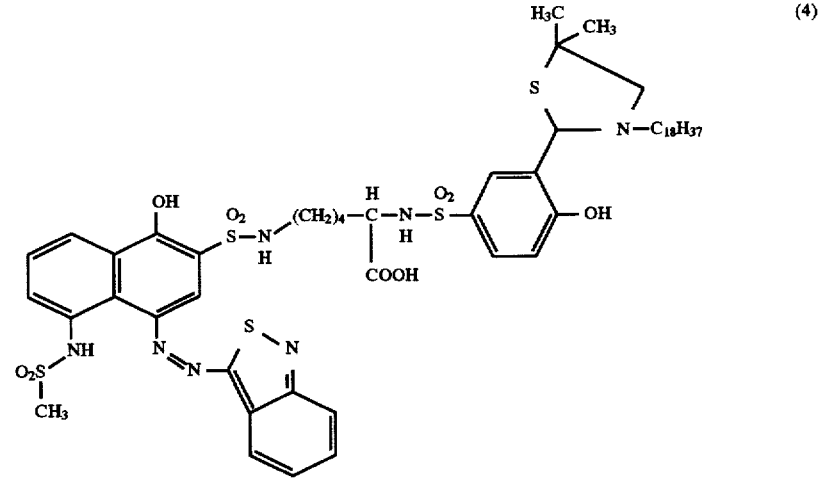
(4)

Illustrative examples of image dye-providing compounds of the present invention within the scope of formula (I) wherein m is 2 and diffusion control moiety G is the preferred thiazolidine moiety of formula (VIII) wherein B is $C_{18}H_{37}$ are represented by formulae (5)–(16):
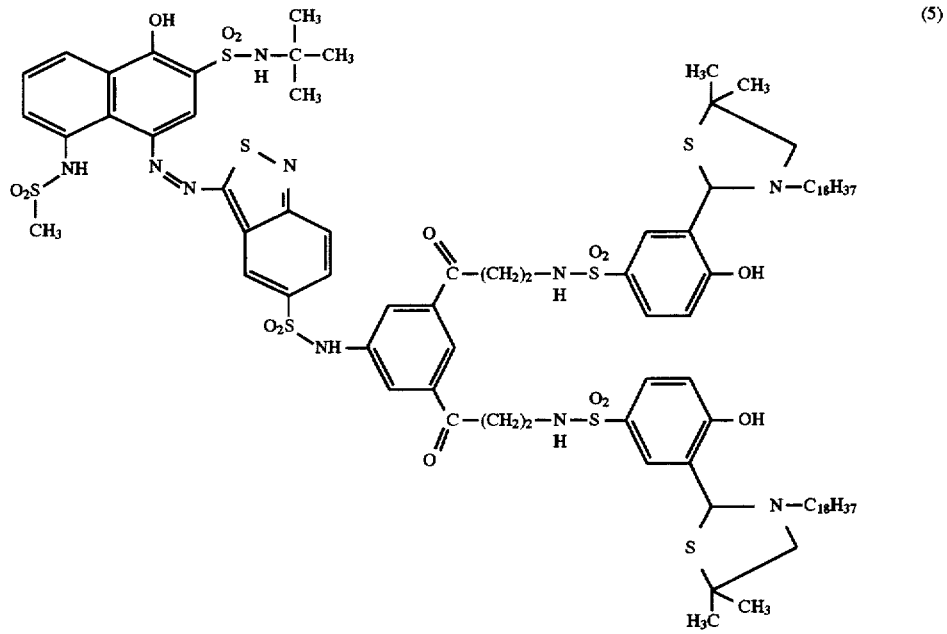
(5)
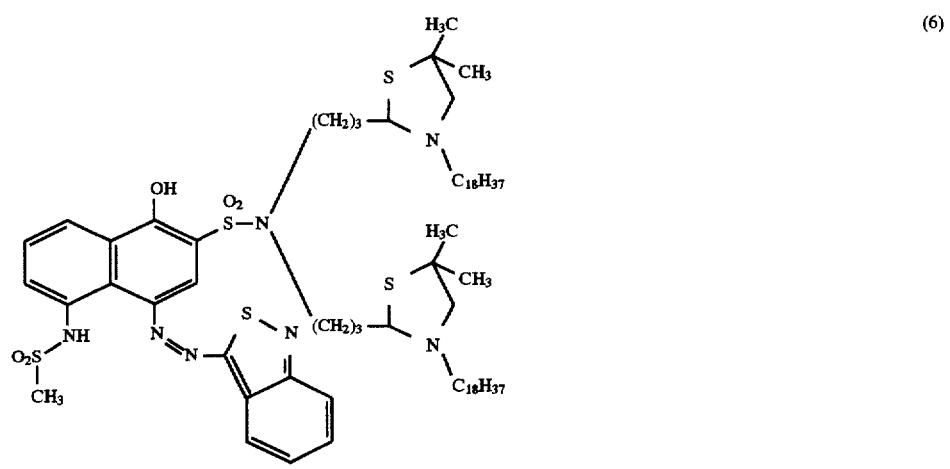
(6)

-continued
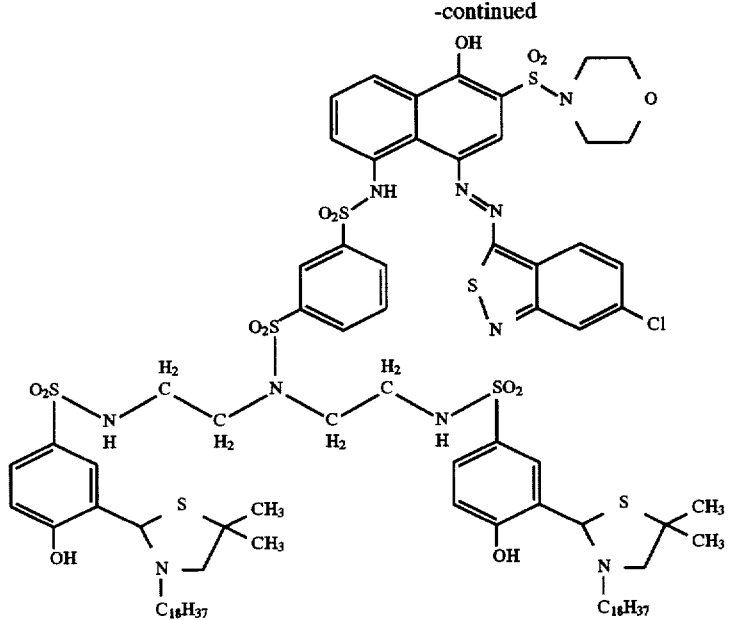
(7)
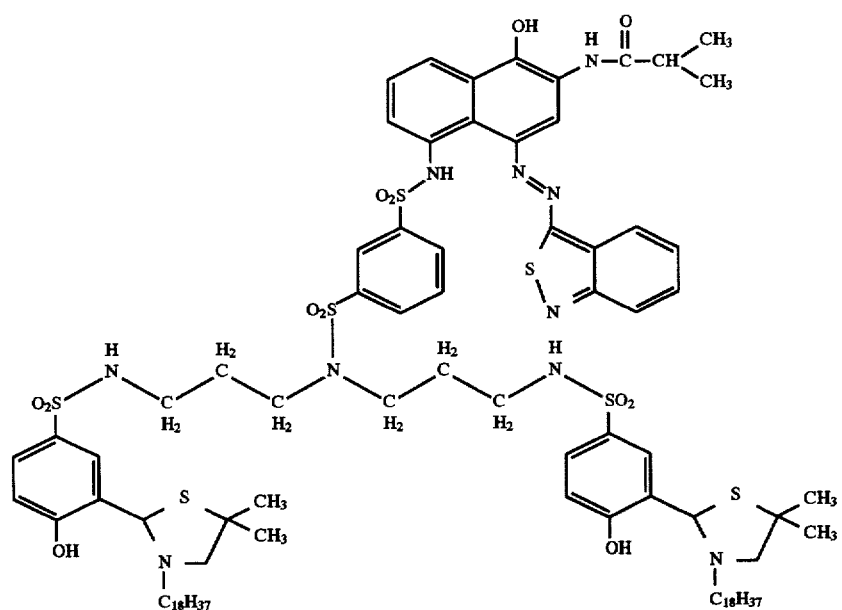
(8)

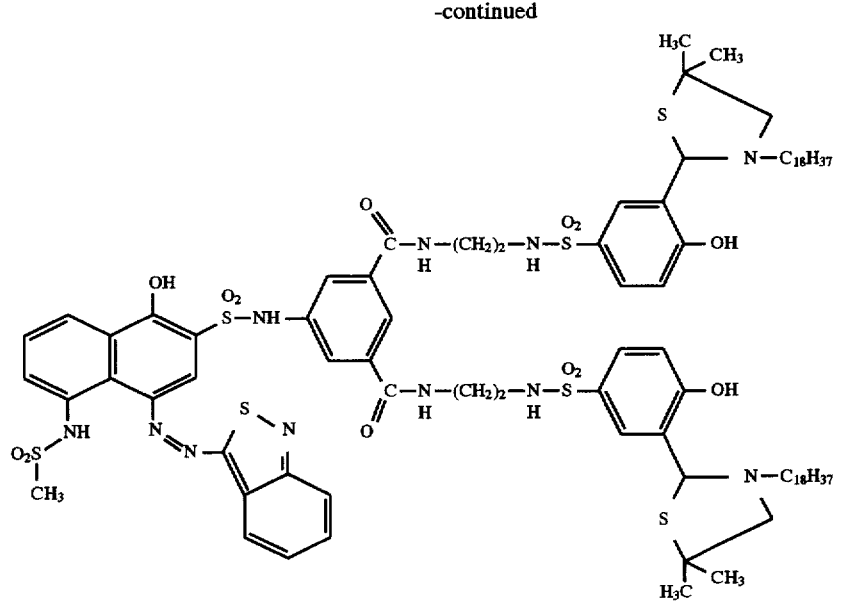
(9)
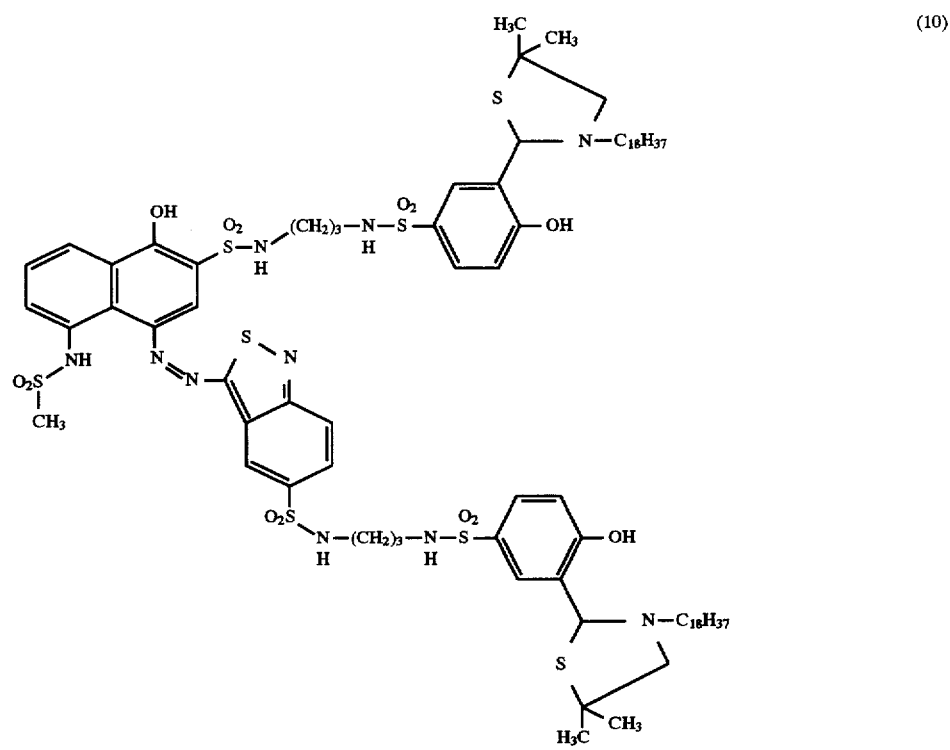
(10)

-continued
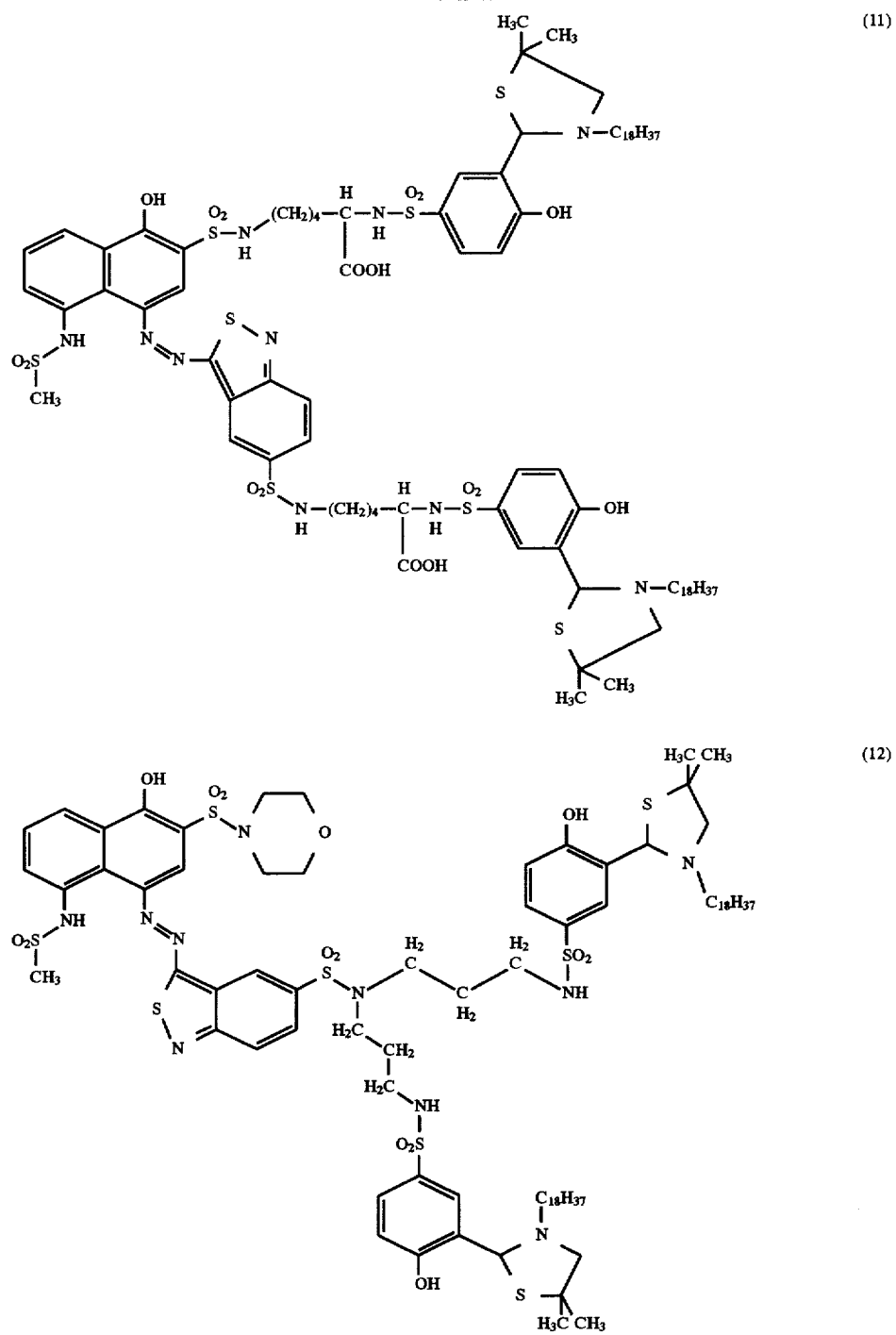

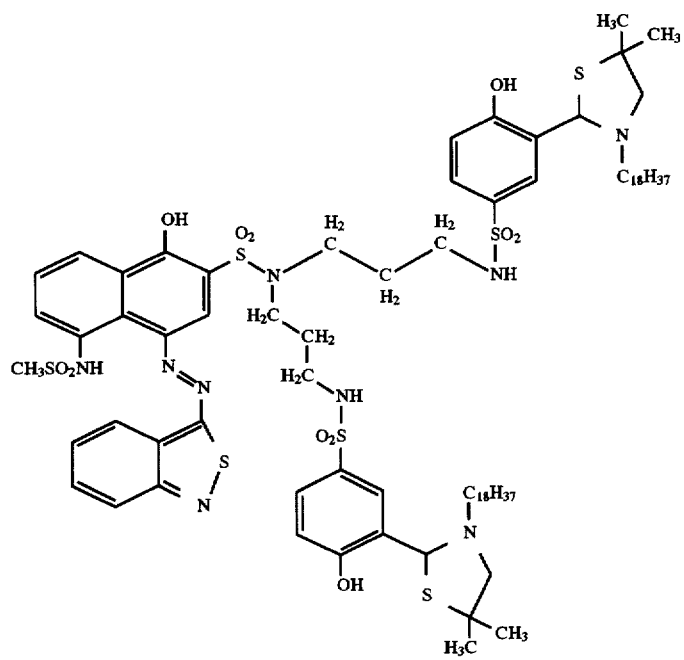
(13)
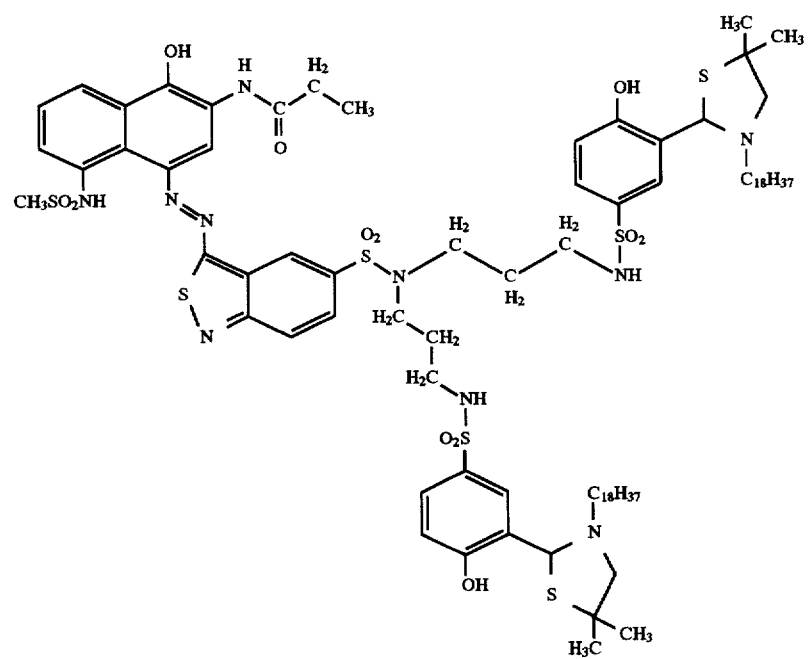
(14)

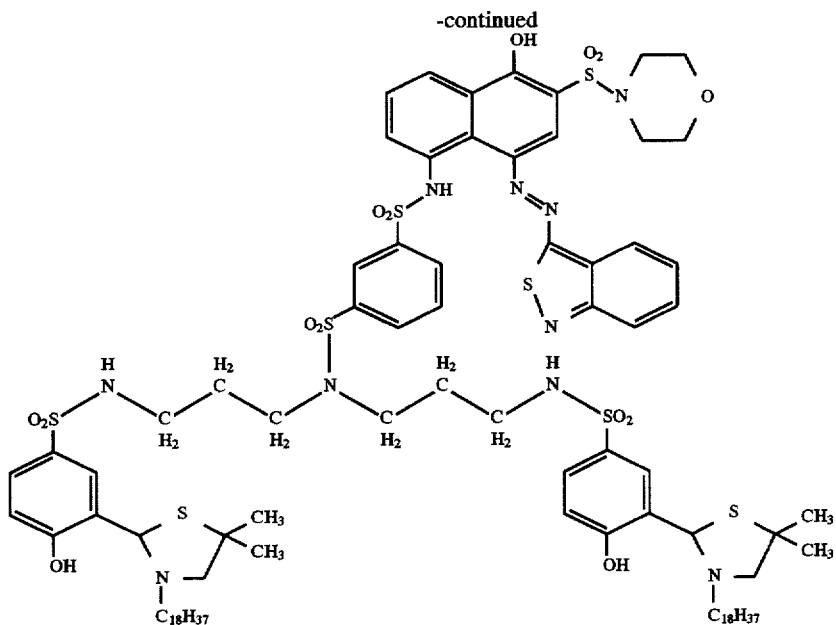
(15)
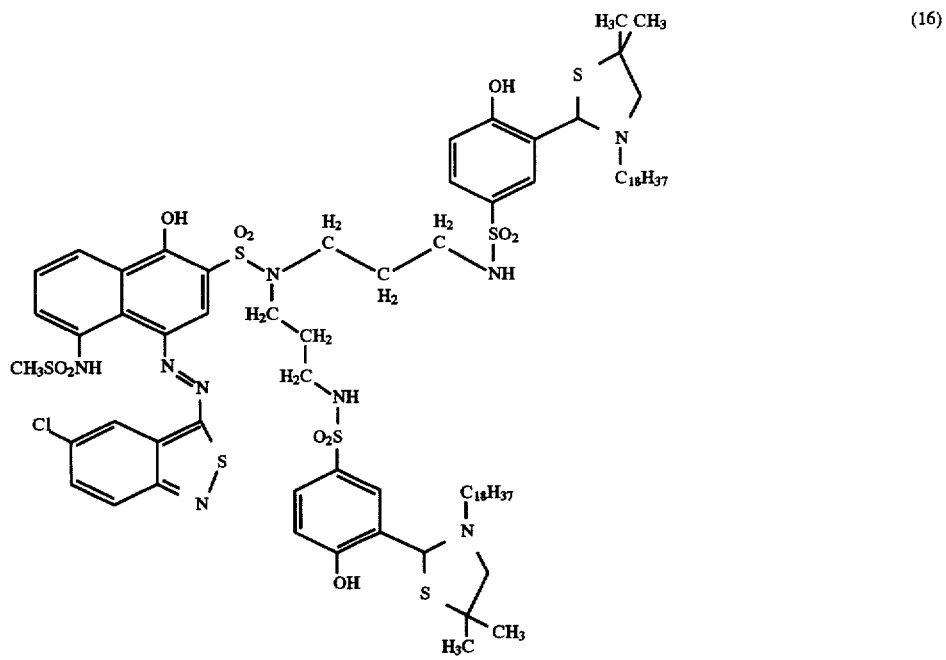
(16)
Additional illustrative examples of image dye-providing compounds of the present invention within the scope of formula (I) are represented by formulae (17)–(22):

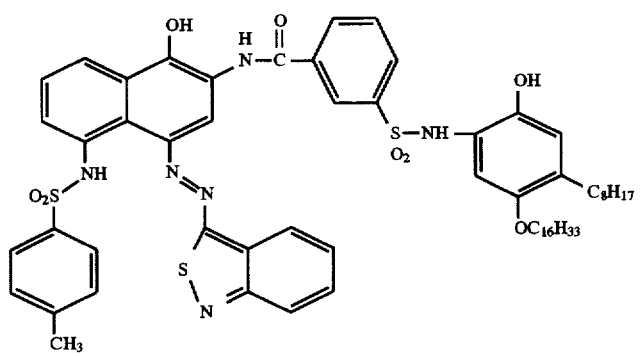
(17)
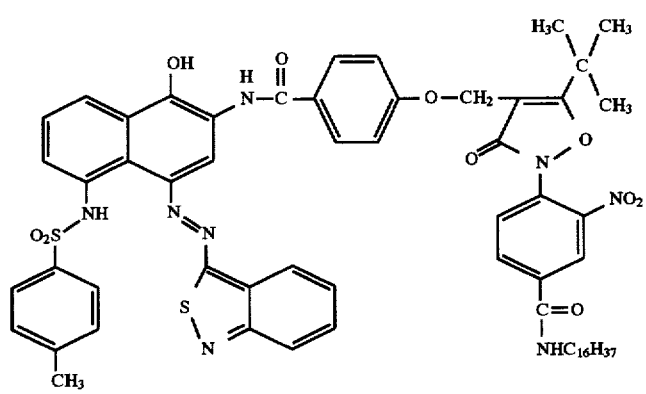
(18)
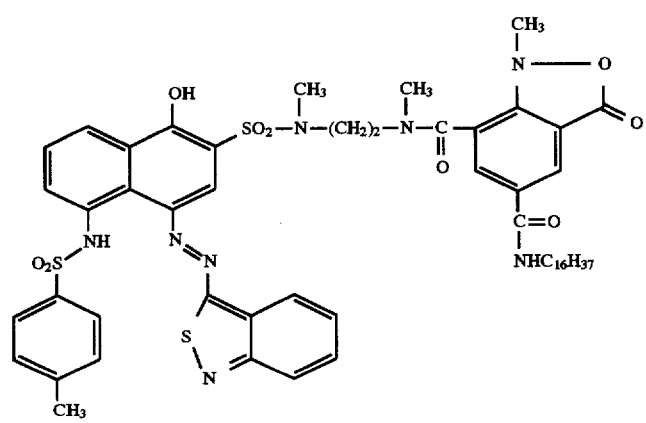
(19)
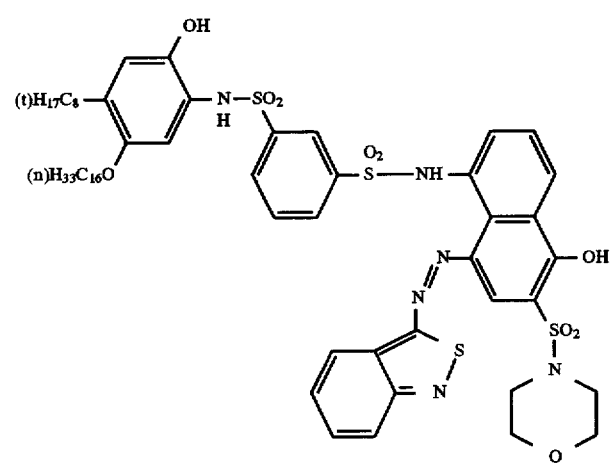
(20)

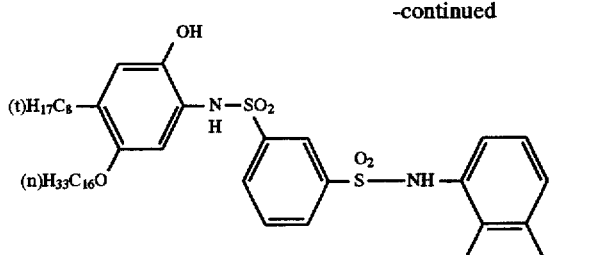

(21)

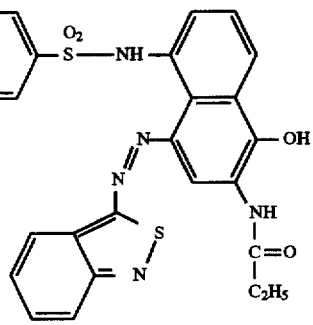

(22)

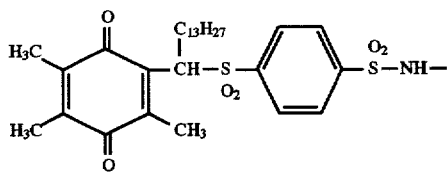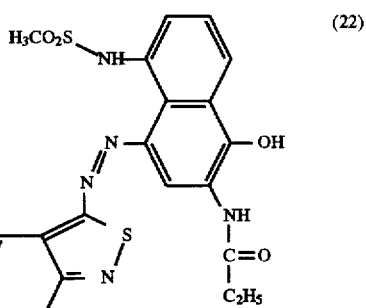

The novel naphthol azo cyan chromophore moiety of the image dye-providing compound according to formula (I) may be used as a complete dye in various applications in addition to its use as the dye component of an image dye-providing compound as described herein, for example, as disclosed and claimed in copending, commonly-assigned U.S. patent application Ser. No. 08/715,454 filed on even date herewith. For instance, the novel naphthol azo cyan dyes may be used in the textile industry to impart color to various materials such as nylon and polyester fibers.

The novel image dye-providing compounds of the present invention can be prepared using reactions which are known in the art and these will be apparent particularly in view of the specific examples provided herein.

The present invention provides novel image-recording materials which are useful for forming color images in photographic, photothermographic and thermographic color imaging systems such as diffusion transfer processes described, for example, in U.S. Pat. Nos. 3,260,598 and 4,740,448; and in aforementioned U.S. Pat. Nos. 3,719,489 and 4,098,783.

Image-recording elements useful in color photographic imaging systems are well known in the art and, therefore, extensive discussion of such materials is not necessary. The novel image-recording materials of the present invention can be prepared in accordance with those procedures known in the art, as well as those methods described herein. In addition, photothermographic image-recording materials of the present invention can be prepared in accordance with such procedures as described in Research Disclosure No. 17029, issued June 1978. Further, the thermographic image-recording materials of the present invention can be prepared as described in U.S. Pat. Nos. 5,328,799 and 5,436,108.

The image-recording materials of the present invention comprise one or more supports and carried by a support: a source of silver ions, an image dye-providing compound according to formula (I) and an image-receiving layer. Embodiments of the present invention wherein the source of silver is a photosensitive silver halide emulsion preferably include means, e.g., a rupturable container, providing an aqueous alkaline processing composition for initiating development of the photosensitive silver halide emulsion after photoexposure to form an image on the image-receiving layer.

In a preferred embodiment of the present invention the image-recording materials comprise:

(a) a photosensitive element comprising: a support carrying a red-sensitive silver halide emulsion layer;

(b) a second sheet-like element which is superposed or superposable on said photosensitive element;

(c) an image-receiving layer positioned in one of said photosensitive or second sheet-like elements;

(d) an image dye-providing compound according to formula (I); and (e) a means for providing an aqueous alkaline processing composition for initiating development of said red-sensitive silver halide emulsion after photoexposure to form an image on said image-receiving layer.

The image-recording materials in other preferred embodiments of the present invention include additional layers, e.g., a green-sensitive silver halide emulsion layer having a magenta image dye-providing material associated therewith, a blue-sensitive silver halide emulsion layer having a yellow image dye-providing compound associated therewith, a timing layer, a polymeric acid-reacting layer or a strip-coat layer.

Preferred photothermographic image-recording materials of the present invention which are useful in the thermal development of a silver halide latent image comprises one or more supports and carried by a support: a photosensitive silver halide emulsion which is preferably red-sensitive silver halide emulsion, a reducing agent, a binder which is preferably gelatin, an image dye-providing compound according to formula (I), an image-receiving layer and one of (a), (b), (c) or (d):

(a) a base-releasing precursor;
(b) a base-releasing precursor and a silver salt oxidizer;
(c) a thermal solvent; or
(d) a silver salt oxidizer and a thermal solvent.

A preferred thermographic image-recording material of the present invention comprises one or more supports and carded by a support:

(a) a silver salt oxidizer or silver salt complex;
(b) a thermal solvent;
(c) a binder which is preferably gelatin;
(d) an image dye-providing compound according to formula (I); and
(e) an image-receiving layer.

It is preferred that the silver salt oxidizing material or silver salt complex is in a layer adjacent to the image dye-providing compound. An auxiliary ligand(s) for silver, e.g., methylthiomethyluracil, may also be included in the heat-developable image-recording materials of the present invention.

The image dye-providing compound of the present invention may be added in any suitable layer, e.g., the same layer as the photosensitive silver halide or the silver salt oxidizer emulsion layer or in a layer on either side of the photosensitive silver halide emulsion layer(s). It is preferred that the image dye-providing compound of the present invention be placed in the photographic and photothermographic image-recording materials so that exposure does not occur through the naphthol azo cyan dye because the dye may absorb the light needed to expose the photosensitive silver halide.

Additionally, in some of the photographic and photothermographic embodiments of the present invention, it may be desirable to separate the image dye-providing compound from the photosensitive silver halide emulsion layer by a spacer layer. Also, where the preferred image dye-providing compound tends to be migratory during storage and/or thermal development of the heat-developable photosensitive imaging systems of the present invention, it is preferred that the image dye-providing compound be in a separate layer and more preferably, that it be in a layer furthest from the image-receiving layer.

The amount of image dye-providing compound of the present invention used in the image-recording materials of the invention varies with the compound chosen but, generally an amount from about 0.25 to about 2.0 mmol/m$^2$ is used.

The image dye-providing materials of the present invention may be incorporated into the photographic layer(s) of the image-recording materials of the invention by any suitable method. For example, the image dye-providing compounds can be dissolved in a low boiling and/or high boiling solvent and dispersed in the binder; they can be dispersed in aqueous solutions of suitable polymers, e.g., gelatin, by means of a ball mill; or, they can be solvent-coated using any organic solvent that will also dissolve gelatin, e.g., trifluoroethanol or dimethylsulfoxide.

It is well known in the art that in conventional photographic systems, a light-sensitive photographic element containing a photosensitive silver halide emulsion layer is exposed to form a latent image, whereupon the exposed silver halide is developed to a visible silver image by a developer solution contained within the image-recording material, e.g., within the processing composition or coated as a component of a layer. Such a developer is generally an aqueous alkaline processing composition and, in general, developer activity increases as the amount of alkali in the developer is increased. Hence, the image-recording materials of the present invention generally include in addition to a source of silver ions, an image dye-providing compound according to formula (I) and an image-receiving layer, means, preferably, a rupturable container, providing an aqueous alkaline processing composition for initiating development of the photosensitive silver halide emulsion after photoexposure to form an image on the image-receiving layer. The aqueous alkaline processing composition may include a silver halide developing agent and a silver halide solvent; alternatively, both of these materials may be coated within the image-recording material.

Any suitable silver halide solvent may be used in the image-recording materials of the present invention. For example, the silver halide solvent may be any of the known silver halide solvents, such as, sodium or potassium thiosulfate, sodium thiocyanate or uracil; thioether-substituted uracils, pseudo-uracils and other compounds described in U.S. Pat. No. 4,126,459; 1,3-disulfonylalkanes as described in U.S. Pat. No. 3,769,014; cycloalkanes as described in U.S. Pat. No. 3,958,992; alkanes containing an intralinear sulfonyl group and, e.g., an intralinear N-tosylsulfimido or N-tosylsulfoximido group as described in U.S. Pat. No. 4,107,176. Further, any suitable silver halide solvent precursor may be used in the image-recording materials of the present invention, such as, those described in U.S. Pat. Nos. 3,698,898 and 4,382,119.

It is well known in the art that the alkaline environment required for silver image development may be generated in situ in the manner described in aforementioned U.S. Pat. No. 3,260,598; U.S. Pat. Nos. 4,740,363 and 4,740,445; and, in commonly-assigned U.S. patent application Ser. No. 08/607,680 filed on Feb. 26, 1996 now abandoned in favor of copending commonly assigned U.S. patent application Ser. No. 08/753,180 filed on Nov. 20, 1996. Accordingly, the novel image-recording materials according to the present invention may have incorporated therein an alkali-generating system.

As stated earlier, it is particularly preferred that the diffusion control moiety(ies) of the image dye-providing compounds of the present invention is a thiazolidine moiety, preferably, as illustrated by formula (VIII). Hence, these particularly preferred image dye-providing compounds of the present invention may be and, preferably are, used as image dye-releasing thiazolidines in subtractive color transfer films which utilize image dye-releasing thiazolidines as the imaging mechanism. Accordingly, in these embodiments of the present invention, the image dye-providing compounds are substantially non-diffusible in the thermographic, photographic and photothermographic image-recording materials but are capable of undergoing cleavage in the presence of the imagewise distribution of silver ions and/or soluble silver salt complex made available in the undeveloped and partially developed areas as a function of development to liberate a more mobile and diffusible dye in a corresponding imagewise distribution.

For example, as stated earlier, it is preferred that the image dye-providing compounds of the present invention contain two diffusion control moieties, preferably cyclic 1,3-sulfur-nitrogen moieties having the group -S-C-N- included in the ring. The cyclic moieties containing the group -S-C-N- included in the ring undergo cleavage between the sulfur atom and the carbon atom common to the sulfur and nitrogen atoms and between the nitrogen atom and the common carbon atom in the presence of silver ions or a soluble silver complex to release the color-providing moieties, i.e., the subject cyan chromophores. As indicated by formula (I), the two cyclic 1,3-sulfur-nitrogen moieties are linked indirectly to the naphthol ring system through a suitable linking group, preferably, a divalent linking group, as shown below available during processing of the emulsion migrates to the associated image dye-providing compound which undergoes cleavage in the presence of the complex to release an imagewise distribution of the more diffusible reagent, e.g., the dye. The subsequent formation of a color image is the result of the differential in diffusibility between the color-providing compound and the liberated complete dye whereby the imagewise distribution of the more diffusible complete dye released in undeveloped and partially developed areas is free to transfer to the image-receiving layer.

As stated above, the image dye-providing compounds of the present invention can be used in the image-recording materials to form multi-color images. If a photosensitive image-recording material is to be used to generate a full-color image, it generally has three different light-sensitive layers each releasing a different color dye as a result of development.

For the thermographic image-recording materials, full-color images may be obtained by using the three subtractive primaries: yellow, magenta and cyan, e.g., by employing three separate thermosensitive sheets, each designed to release a different diffusible dye as a result of thermal

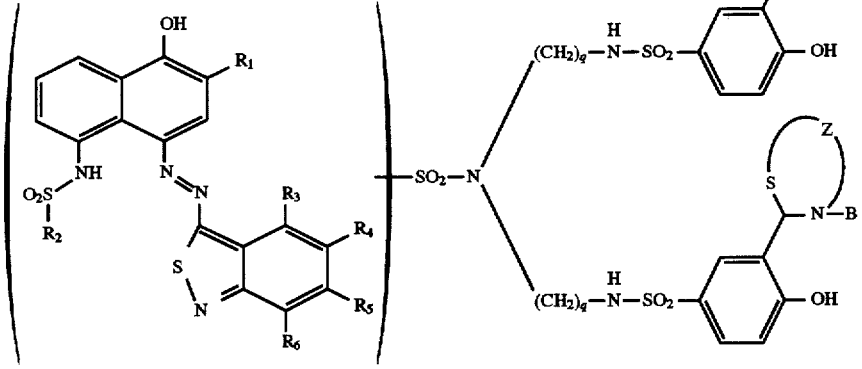

wherein: $R_1$ through $R_6$, q and B are as previously described for formulae (I), (VI) and (VIII), respectively; Z represents the carbon atoms necessary to complete an unsubstituted or substituted 5- or 6-membered heterocyclic ring system; and, the -$SO_2$ group of the linker is attached to the chromophore as described previously.

For forming color images in photographic image-recording systems, an image dye-providing compound of the present invention can be used in both monochrome, e.g., see Example VI herein, and full-color imaging systems such as disclosed in aforementioned U.S. Pat. Nos. 4,098,783 and 3,719,489. Generally, in these systems, an image dye-providing compound is associated with a photosensitive silver halide emulsion which, after being exposed, is developed with an aqueous alkaline processing solution, generally released from a rupturable container, which may include a suitable silver halide developing agent and/or a suitable silver halide solvent. The imagewise distribution of silver ions such as contained in the soluble silver complex made development. The image to be reproduced is generally separated into its blue, green and red components and each color record is printed in registration, using the corresponding thermosensitive sheet, on the same receiving sheet in a manner analogous to that used in conventional dye diffusion thermal transfer processes, such as described, for example, in Advanced Printing of Conference Summaries, SPSE's 43rd Annual Conference, May 20-25, 1990, pp. 266-268, SPSE, Springfield, Va., D. J. Harrison, *Thermal Dye Transfer Hard Copy Chemistry and Technology*, Eastman Kodak Company, Rochester, N.Y.

Where multi-color images are desired, one or more layers containing a scavenger for silver ion and/or soluble silver complex may be employed between the photosensitive emulsion layers to enhance color separation. By virtue of the silver scavenger layer(s) being positioned between the emulsion layers, the migration of the imagewise distribution of soluble silver ions or soluble silver complex formed during processing of each emulsion layer is confined to the area of the compound associated with each emulsion layer and prevented from diffusing into the area of the compound associated with the other emulsion layer or layers. Silver scavengers which may be employed in the present invention include those described in aforementioned U.S. Pat. No. 4,060,417.

The source of silver ions for use in the image-recording materials of the present invention can be any of those materials commonly employed in the photographic art to provide silver ions provided the silver ion is made available imagewise upon processing to, e.g., cleave the cyclic 1,3-sulfur-nitrogen moiety(ies) of the compound and release the diffusible reagent, i.e., the novel naphthol azo cyan dye. Useful materials include silver halides and any of the silver salt oxidizing materials known in the art, such as those described in aforementioned Research Disclosure No. 17029. The silver salt oxidizing material is generally an organic silver salt, e.g., silver behenate, or silver salt complex as is known in the art such as described in U.S. Pat. Nos. 4,260,677; 4,729,942; and 5,320,929; and, in aforementioned U.S. Pat. No. 5,436,108.

The photosensitive silver halide used in the present invention may be any photosensitive silver halide employed in the photographic art, such as, silver chloride, iodide, bromide, iodobromide, chlorobromide, etc., and it may be prepared in situ or ex situ by any known method including using a light-sensitive silver halide-forming component in the presence of the silver salt oxidizing material so as to form the light-sensitive silver halide in part of the silver salt oxidizer.

Any suitable known silver halide precipitation method may be employed in the preparation of the emulsions. Preferably, the photosensitive silver halide emulsions are aqueous silver halide emulsions which are generally added to each photosensitive layer in an amount calculated to give a coated coverage in the range of from about 0.5 to about 8.0 mmol/m$^2$, preferably from about 0.5 to about 4.0 mmol/m$^2$.

The photosensitive silver halide emulsions may be spectrally sensitized by any suitable spectral sensitization method and material in order to extend the photographic sensitivity to wavelengths other than those absorbed by the unsensitized silver halide. Examples of suitable sensitizing materials include cyanine dyes, merocyanine, styryl dyes, hemicyanine dyes and oxonole dyes. In addition, the silver halide emulsions may be chemically sensitized using any suitable chemical sensitization technique and material.

The silver salt oxidizer used in embodiments of the present invention can be prepared in a suitable binder by any known means and then used immediately without being isolated. Alternatively, the silver salt oxidizer may be isolated and then dispersed in a suitable binder. The silver salt oxidizer is generally used in an amount ranging from about 0.5 to about 12.0 mmol/m$^2$, and preferably from about 0.5 to about 4.0 mmol/m$^2$.

Any suitable reducing agents may be used in the image-recording materials of the present invention. The silver halide developing agent may be selected from those commonly employed such as inorganic reducing agents, for example, sodium sulfite and sodium hydrogen sulfite; hydroxylamines; hydrazines; hydrazides; boran-amine complexes; diaminobenzenes such as paraphenylenediamine; aminophenols such as methyl-p-aminophenol; and dihydroxybenzenes such as hydroquinone. It is preferred to use aminoreductone or p-butoxyphenidone as the reducing agent. As stated earlier, the developer may be coated in the image-recording material, for example, as described in example (VI) herein.

Reducing agents which may be used in the heat-developable photographic image-recording materials of the present invention may be selected from among those commonly used in heat-developable photographic materials. Illustrative reducing agents useful in the present invention include tetramethylreductic acid; hydroquinone and its derivatives such as 2-chlorohydroquinone; aminophenol derivatives such as 4-aminophenol and 3,5-dibromophenol; catechol and its derivatives such as 3-methoxycatechol; phenylenediamine derivatives such as N,N-diethyl-p-phenylene-diamine; 3-pyrazolidone derivatives such as 1-phenyl-3-pyrazolidone and 4-hydroxymethyl-4-methyl-1-phenyl-3-pyrazolidone; 3-pyrazolidinones; hydroxytetronic acids; ascorbic acids; and, 4-amino-5-pyrazolones. It is preferred to use 1-phenyl-3-pyrazolidone, commercially available under the tradename Phenidone, and 4-hydroxymethyl-4-methyl-1-phenyl-3-pyrazolidone, commercially available under the tradename Dimezone-S, as the reducing agents in the image-recording materials of the present invention.

In addition, it is known to use reductone developer agents such as aminoreductone in image-recording elements, for example, see U.S. Pat. Nos. 4,433,037; 4,550,071; 4,639,407; and 5,427,905. It is preferred to use amino-reductone in the image-recording materials of the present invention.

The reducing agents may be used singly or in combination and they are generally employed in amounts ranging from about 0.5 to about 10.0 mmol/m$^2$, and preferably from about 1.0 to about 8.0 mmol/m$^2$.

The image-recording materials of the present invention may also include reducing agent precursors. Reducing agent precursors do not have a reducing property by themselves but may express a reducing capacity with the aid of a nucleating reagent or under heat during the step of development, for example, as described in U.S. Pat. Nos. 5,336,761 and 4,500,626.

The heat-developable image-recording materials of the present invention may, and preferably do, additionally contain a thermal solvent(s). The thermal solvent(s) may be incorporated in one or more layers in the image-recording materials of the present invention. Thermal solvents which are useful in heat-developable imaging materials and methods are nonhydrolyzable, thermally-stable compounds which are solids at ambient temperature but which melt at or below the temperature used in thermal processing. The thermal solvent acts as a solvent for various components of the heat-developable image-recording material, assists in the acceleration of thermal development, and provides the medium for diffusion of various components including silver ions and/or complexes, reducing agents and image dye materials. The amount of thermal solvent present in a single layer is typically from 0 to about 10 g/m$^2$ and preferably from about 0.1 to about 1.5 g/m$^2$.

Any suitable, e.g., for use with gelatin as described in U.S. Pat. No. 5,368,979, thermal solvent may be incorporated in the heat-developable image-recording materials of the present invention. Many suitable thermal solvents for use in heat-developable image recording materials are known in the art such as those described in U.S. Pat. Nos. 3,347,675 and 3,667,959. It would be apparent to those skilled in the art that the choice of a thermal solvent(s) should be made such that its use in the image-recording material would not have any adverse effect upon the image formation process. In embodiments of the present invention wherein the thermographic image-recording material having an alkali-generating system is processed in the absence of water, a thermal solvent, such as those described above, may act as the fluid required for alkali generation.

The image-recording materials of the present invention may contain any suitable binders. Suitable binders for photosensitive silver halide emulsion layers include water-soluble synthetic, high-molecular weight compounds such as polyvinyl alcohol and polyvinylpyrrolidone and synthetic or naturally-occurring high molecular weight compounds such as gelatin, gelatin derivatives, cellulose derivatives, proteins, starches and gum arabic. A preferred binder material is gelatin. A single binder or mixture of binders may be used. The amount of binder used in each layer is generally from about 0.5 to about 5.0 g/m², preferably from about 0.5 to about 3.0 g/m².

Embodiments of the present invention wherein the image-recording materials contain a crosslinkable colloid as a binder, e.g., gelatin, can be hardened by using various organic and inorganic hardeners such as those described in T. H. James, *The Theory of the Photographic Process*, 4th Ed., MacMillan, 1977, pp. 77–87. The hardeners can be used alone or in combination. It is preferred that the image-recording materials according to the present invention contain a hardener in the photosensitive silver halide emulsion layer. Any suitable hardener known in the photographic art may be used; however, aldehyde hardeners, e.g. succinaldehyde and glyoxal, have been found to be particularly useful when gelatin is employed as the binder. The hardeners are generally used in amounts ranging from about 1 to about 10% by weight of the total amount of gelatin coated.

Any suitable support may be used in the image-recording materials of the present invention, for example, those described for photothermographic materials in aforementioned Research Disclosure No. 17029. Specific examples of suitable supports include synthetic polymeric films, such as polyethylene terephthalate, polycarbonate, polyvinyl chloride, polystyrene, polyethylene, polypropylene and polyimide. Other supports include paper supports, such as photographic raw paper, printing paper, baryta paper and resin-coated paper having paper laminated with pigmented thermoplastic resins, fabrics, glass and metals. Preferably, a polyester film is used. The support(s) for the heat-developable image-recording elements of the present invention must necessarily be able to withstand the heat required for processing the image. The support can be transparent or opaque. The above described non-opaque supports can be made opaque by incorporating pigments therein such as titanium dioxide and calcium carbonate.

A subcoat may be added to the face of the support which carries the heat-developable photosensitive materials of the present invention to increase adhesion. For example, a polyester base coated with a gelatin subcoat has been found to enhance adhesion of aqueous based layers.

Various polymeric materials have been utilized as mordants in photographic products and processes including those of the diffusion transfer type. Any suitable mordant may be used in the image-recording materials of the present invention. The mordants used in the image-recording materials of the present invention may be selected from a variety of mordants; however, it is preferred to use a polymeric mordant. Polymeric mordants suited to application in diffusion transfer products and processes for the formation of photographic images in dye are described, for example, in U.S. Pat. Nos. 3,148,061; 3,758,445; 3,770,439; 3,898,088; 4,080,346; 4,308,335; 4,322,489; 4,563,411; 4,749,067; and 5,395,731. The mordant layer may also include other materials, such as, poly-4-vinylpyridine (P4VP), polyvinylalcohol (PVA), crosslinkers and surfactants.

The photothermographic image-recording materials of the present invention optionally may include other materials known in the art for use in photothermographic image-recording materials. These include, but are not limited to, antifoggants such as described in U.S. Pat. No. 4,743,533, antistatic materials, coating aids e.g. surfactants, activators and the like.

Any suitable development restrainer and/or development restrainer precursor may be used in the image-recording materials of the present invention. It is known in the art to utilize development restrainers and development restrainer precursors in image-recording materials used in photographic applications. A predetermined level of development usually will take place before the development restrainers or development restrainer precursors function to inhibit or control further development.

The blocked development restrainers are designed to provide a controlled release of the development restrainer during the development process. Such blocked development restrainers are disclosed, for example, in:

(1) U.S. Pat. Nos. 3,260,597 and 3,265,498 which disclose hydrolyzable blocked restrainers;

(2) U.S. Pat. No. 3,698,898 which discloses the use of quinone- or naphthoquinonemethide precursors which release a photographic reagent such as 1-phenyl-5-mercaptotetrazole in the presence of alkali;

(3) U.S. Pat. No. 3,938,996 which discloses the use of a carbocyclic blocking group which includes an oxime group (e.g. -C=N-OH);

(4) U.S. Pat. No. 4,009,029 which discloses a class of cyanoethyl-containing blocked development restrainers; and (5) German Offenlegungsschrift No. 2,427,813 which discloses various blocked development restrainers.

In addition, U.S. Pat. No. 4,946,964 discloses and claims compounds capable of providing controlled release of development restrainers during the development process. Furthermore, as mentioned earlier, the developer itself may be blocked, i.e., reducing agent precursors which do not have a reducing property by themselves but may express a reducing capacity with the aid of a nucleating reagent or under heat during the step of development.

Development activators may also be used in the image-recording materials of the present invention, for example, as described in U.S. Pat. Nos. 2,162,714; 3,173,786; 3,301, 678; 3,669,670; 3,839,041; 3,844,788; 3,877,940; 3,893,859; 4,012,260; 4,060,420; 4,677,206; and, in Belgian Patent No. 768,071.

The photosensitive elements optionally may contain additional layers commonly used in the art, such as spacer layers, a layer of an antihalation dye, and/or a layer of a filter dye arranged between differentially color-sensitive emulsion layers. A protective layer(s) may also be included in the image-recording materials of the present invention. The protective layer may contain a variety of additives commonly employed in the photographic art, such as, matting agents, colloidal silica, slip agents, toning agents, organofluoro compounds, ultraviolet absorbers, accelerators, antioxidants, etc.

Any image-receiving layer which has the capability of receiving the novel azo naphthol cyan dye released as a result of development may be used in the image-recording materials of the present invention. Suitable image-receiving layers include those which can be prepared by coating a suitable support material with a suitable polymer for receiving the dye. Suitable polymers to be coated on the image-receiving support to receive the dye include polyvinylchloride (PVC), poly(methylmethacrylate), polyester and polycarbonate. It is preferred to use a combination of PVA and P4VP. Alternatively, certain polymers may be used as both the support and the dye-receiving material.

In the heat-developable imaging-recording materials of the present invention, the image-receiving layer may be superposed on the photosensitive element after exposure and the two heated simultaneously to develop the image and cause the dye to transfer. Alternatively, the photosensitive element may be exposed and then processed with heat, followed by superposing the image-receiving sheet on the exposed and developed photosensitive material and applying heat and pressure to transfer the dye. In either embodiment, after heat-development, the two layers may be retained together as a single element or they can be peeled apart from one another.

The heat-developable image-recording materials of the present invention may be processed in the presence of a base or a base-precursor. It is known in the art that the base or base-precursor may be either added to the image-recording material or generated internally by reactions of compounds incorporated in the imaging materials.

In contrast, it is also known in the art that heat-developable photographic systems may be processed in the absence of a base or a base-precursor, for example, the color-providing moiety transfers due to the hydrophobicity of the polymer such as PVC which is coated on the image-receiving support, as described above, to receive the color-providing moiety.

Film products comprising sheets that are separated after processing are described as "peel-apart" films. In integral films, the sheets, together with, e.g., a rupturable container which contains an aqueous alkaline processing composition such as described in aforementioned U.S. Pat. No. 3,719,489 or an alkali-generating system such as disclosed and claimed in aforementioned, commonly-assigned U.S. patent application Ser. No. 08/607,680 filed on Feb. 26, 1996 now abandoned in favor of copending commonly assigned U.S. patent application Ser. No. 08/753,180 filed on Nov. 20, 1996, are retained as sealed film units, providing images that are ready for viewing without separation of the two sheets. The image-recording materials of the present invention include both peel-apart and integral type film structures.

U.S. Pat. No. 3,415,644 describes an integral color print film structure which comprises a multilayer negative sheet and a positive sheet preassembled with a rupturable container or an alkali-generating system and sealed together at the edges. In the film units described therein, exposure and viewing of the image take place through the same surface. The final image is viewed through a transparent (support) element against a light-reflecting, e.g., white, background. Photoexposure is made through said transparent element and, the application of the processing composition provides a layer of light-reflecting material, preferably titanium dioxide, to provide the white background. The light-reflecting material (referred to therein as an "opacifying agent") performs additional functions, such as, masking (by opacification) the developed silver halide emulsions so that the transfer image may be viewed without interference therefrom; and, protecting the photoexposed silver halide emulsions from photoexposure fogging by light passing through said transparent layer in those embodiments wherein the photoexposed film unit is removed from the camera before image-formation is completed.

In addition, U.S. Pat. No. 3,647,437 discloses the use of light-absorbing materials, e.g., pH-sensitive phthalein dyes, for use in, e.g., the photographic products and processes described in aforementioned U.S. Pat. No. 3,415,644, to permit the completion of image-formation, outside of the camera in which photoexposure is effected, under ambient light conditions. The light-absorbing material or reagent ("optical filter agent") is positioned and/or constituted so as to: (1) not interfere with photoexposure, (2) absorb light which otherwise might fog the photoexposed emulsions during processing (by being positioned between the photoexposed silver halide emulsions and the transparent support) and (3) not interfere with viewing of the desired image shortly after said image has been formed. For example, the optical filter agent may be a dye which is highly colored at the pH of the processing composition, e.g., pH 13–14, but is substantially non-absorbing of visible light at a lower pH, e.g., less than pH 10–12, such as that effected by an acid-reacting reagent appropriately positioned in the film unit, e.g., in a layer between the transparent support and the image-receiving layer.

In embodiments of the present invention wherein the image-recording materials include an optical filter agent(s), the optical filter agent is preferably initially contained in the processing composition together with a suitable light-reflecting material, preferably, titanium dioxide, as described above. The concentration of the, e.g., light-absorbing dye, is selected to provide the light transmission opacity required to perform the particular process under the selected light conditions.

U.S. Pat. Nos. 3,594,165 and 3,689,262; Belg. Patent 757,960; and Hanson, W. T., Jr. 1976, "A Fundamentally New Imaging Technology for Instant Photography," Photogr. Sci. Eng., 20, 155–160 describe an alternative integral film configuration which provides both emulsion and receiving layers as coatings on the same support, in combination with a spreader sheet. The film unit described therein is exposed through one surface and the image is viewed through the opposite surface.

Embodiments of the present invention include any suitable film structure including the alterative film configurations described above. For example, the image dye-providing compounds of the present invention may be used in image-recording materials wherein the photosensitive silver halide emulsion layer(s) and the image-receiving layer are initially contained in separate elements which are brought into superposition subsequent or prior to exposure. After development the two layers may be retained together in a single element, i.e., an integral negative-positive film unit or they can be peeled apart from one another. Where the photosensitive silver halide emulsion layer(s) and the image-receiving layer are retained together as an integral negative-positive film unit, a masking layer, e.g., titanium dioxide, is generally necessary to conceal the untransferred dye from the final image.

Alternatively, rather than being in separate elements, as described above, the photosensitive layer(s) and the image-receiving layer of the image-recording materials containing the image dye-providing compounds of the present invention may initially be in a single element wherein the photosensitive and image-receiving elements are contained in, for example, a heat-developable photosensitive laminate, as described above, or otherwise retained together in an integral structure.

The photosensitive image-recording materials of the present invention may be exposed by any of the methods used in the photographic art, e.g., a tungsten lamp, a mercury vapor lamp, a halogen lamp, fluorescent light, a xenon flash lamp, a light emitting diode including those which emit infrared radiation or a laser.

The thermographic and photothermographic image-recording materials of the present invention are heat-developed after imagewise exposure. Any method of heating that can be employed in heat-developable photosensitive systems may be applied to the heat-developable image-recording materials of the present invention. Thus, for example, heating may be accomplished by using a hot plate, an iron such as a waffle iron, heated rollers or a hot drum. Heat can be used alone or heat may be applied simultaneously with pressure, e.g., by using heated rollers or plates, if necessary, to create good thermal contact between the photosensitive and image-receiving elements. Alternatively, heat and, if required, pressure can be applied subsequent to thermal development in order to transfer the released reagent.

Generally, the heat-developable image-recording materials of the present invention are heated at a temperature in the range of from about 80° to 160° C., preferably in the range of from about 100° to 120° C., for a period of from about 1 to 720 seconds, preferably from about 1.5 to 180 seconds. The preferred temperature range is 80° to 120° C. for embodiments in which the image-recording material has an alkali-generating system incorporated therein.

Embodiments of the image-recording materials of the present invention utilize image-forming systems incorporated therein which use water as a reaction medium. Water may be available by any suitable means, for example, by supplying water from without the system, or, by previously incorporating water-containing capsules or similar means in the system and breaking the capsules by heating or the like to release the water. In addition, a water-releasing compound may be used which releases water by decomposition during heat development, such as described in U.S. Pat. No. 4,550,071.

The invention will now be described further in detail with respect to specific preferred embodiments by way of examples, it being understood that these are intended to be illustrative only, and the invention is not limited to the materials, procedures, amounts, etc. recited therein. All parts and percentages recited are by weight unless otherwise stated.

EXAMPLE I

Preparation of Compound (12)

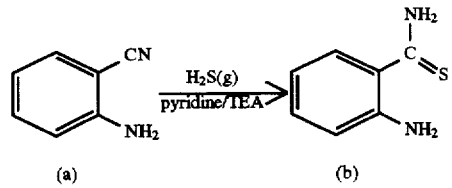

Compound (a), anthranilonitrile, (450 g. 3.81 mol, Aldrich), was dissolved in dry pyridine (500 mL) and dry triethylamine (TEA, 200 mL) in a flask. Hydrogen sulfide (g) was slowly bubbled into the reaction solution over a 3 hour (h) period which was then stirred overnight (O/N) at room temperature (RT). The reaction flask was purged under air for 3 to 4 h. The reaction solution was concentrated (2–3 h, 60° C.), transferred to a new flask, quenched into warm (45° C.) tap $H_2O$ and stirred O/N at RT. The crystals were vacuum filtered, rinsed with water, pressed dry and air dried O/N. The air-dried weight of compound (b), thiobenzamide, was 464.7 g (81.9% yield). Mass spectroscopy by $FAB^+$ (fast atom bombardment techniques) gave the expected molecular ion, m/e=153. Proton NMR (DMSO-$d_6$) was consistent with the proposed structure of compound (b). Thin layer chromatography (TLC) (2% $MeOH/CH_2Cl_2$, $R_f$=0.40) was consistent with compound (b).

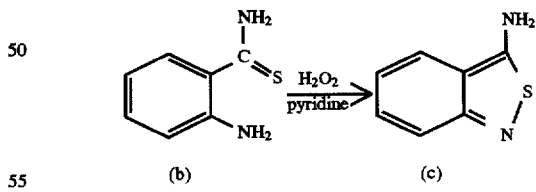

Compound (b) (464.7 g, 3.05 mol) was added to pyridine (450 mL). The suspension was chilled externally to 10° C. whereupon 30% $H_2O_2$ (418 mL, 3.66 mol, 20% molar excess) was added dropwise over 4–5 h while maintaining the reaction temperature of 10° C. The reaction solution was stirred O/N at RT. The solids were collected by vacuum filtration, rinsed with solvent (500 mL) and recrystallized (335 g, 71.5%) from toluene (2 L). The crystals were vacuum filtered, rinsed with $H_2O$, pressed dry and then air dried O/N. The air-dried weight of compound (c), 3-amino- 2,1-benzisothiazole, was 297.8 g (65.0% yield). Mass spectroscopy by FAB⁺ gave the expected molecular ion, m/e= 151. Proton NMR (DMSO-d₆) was consistent with the proposed structure of compound (c). TLC (2% MeOH/CH₂Cl₂, $R_f$=0.40) was consistent with compound (c).

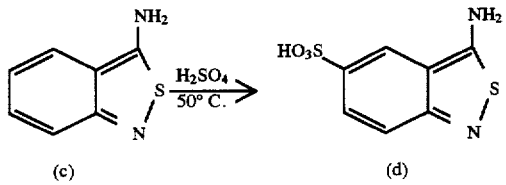

(c)　　　　　　　　(d)

Compound (c) (8 g, 53.33 mmol) was dissolved in 18M H₂SO₄ (80 mL), warmed to 50° C. for 1 h, cooled, poured into cold acetone (500 mL), stirred for 20 minutes (min) and filtered (yielding 7 g of compound (d), 3-amino-2,1-benzisothiazole-5-sulfonic acid). NMR and mass spectroscopy were consistent with the proposed structure of compound (d).

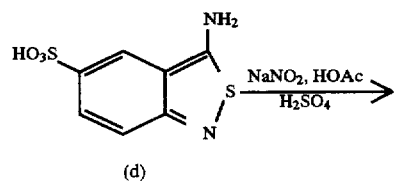

(d)

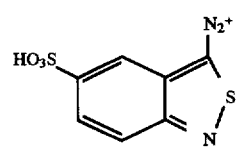

(e)

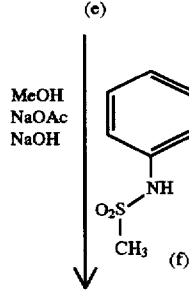

(f)

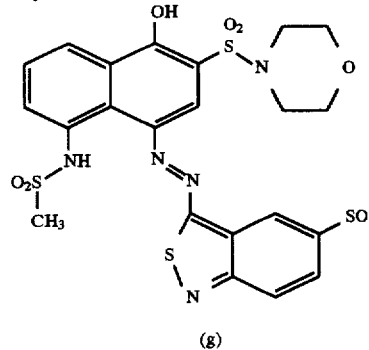

(g)

NaNO₂ (1.7 g) was added to 18M H₂SO₄ (25 mL). The mixture was heated to 70° C., cooled on ice to below 5° C. and propionic/acetic acid (1:5, 25 mL) added slowly so as to keep the temperature below 15° C. This temperature was maintained while compound (d) (7 g) was added over 10 min, followed by the addition of propionic/acetic acid (50 mL), resulting in compound (e). The mixture was stirred for 3 h at 0°–5° C., poured into a cold solution of compound (f), 2-(morpholinosulfamoyl)-5-methanesulfonamido-1-naphthol, (7.5 g), NaOAc (50 g), KOH (10 mL, 40% in MeOH) and H₂O (50 mL), stirred in an ice bath for 1 h and then, stirred at RT for several h. The mixture was acidified with 12M HCl, filtered and the solids (3 g) triturated with tetrahydrofuran (THF). NMR was consistent with the proposed structure of compound (g).

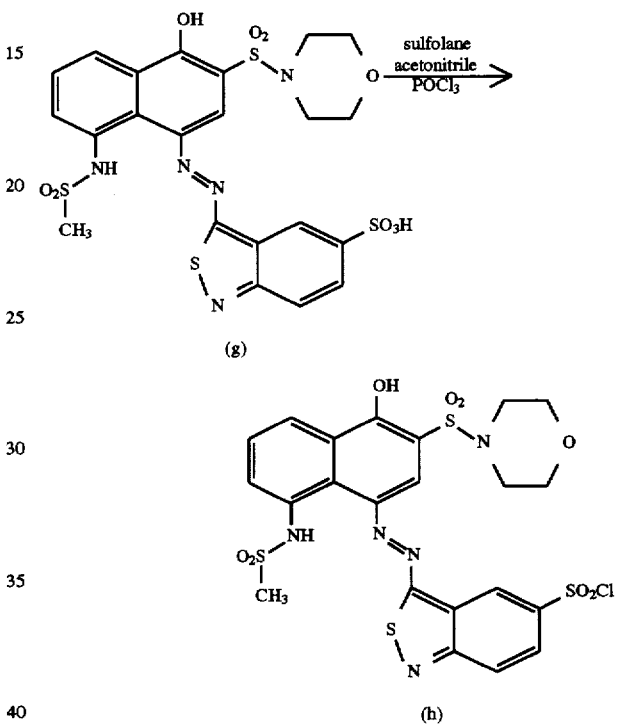

(g)

(h)

Compound (g) (3 g) was slurried in sulfolane (30 mL) and CH₃CN (15 mL), POCl₃ (3 mL) was added and the mixture stirred O/N at RT. The mixture was poured onto ice (300 mL), stirred for 1 h, the suspension filtered and the product, compound (h), air dried (yielding 1.2 g). Mass spectroscopy was consistent with the proposed structure of compound (h).

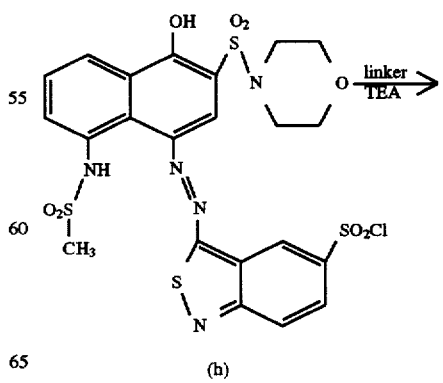

(h)

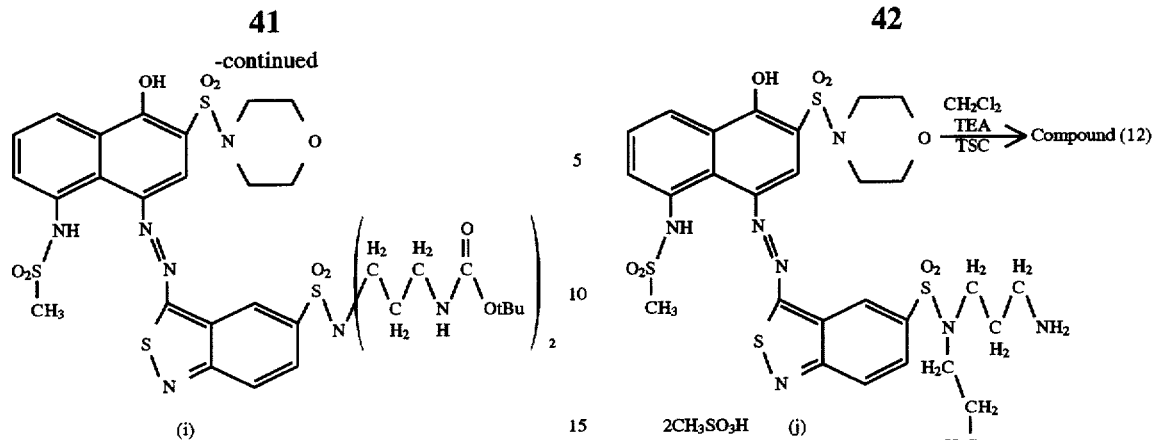

(i)

Compound (h) (1.2 g, 1.86 mmol) was partially dissolved in $CH_2Cl_2$ (25 mL) and then, TEA (264 μl) was added. 1,7-N,N'-t-butoxy carbonyl-1,7-diamino-4-azaheptane ('BOC linker, 615 mg, 1.86 mmol) was added and the mixture was stirred O/N at RT. The solvent was removed under vacuum. The crude product was purified by chromatography on silica gel using 10% MeOH/$CH_2Cl_2$ as the eluent. (420 mg of Compound (i)). NMR and mass spectroscopy were consistent with the proposed structure of compound (i).

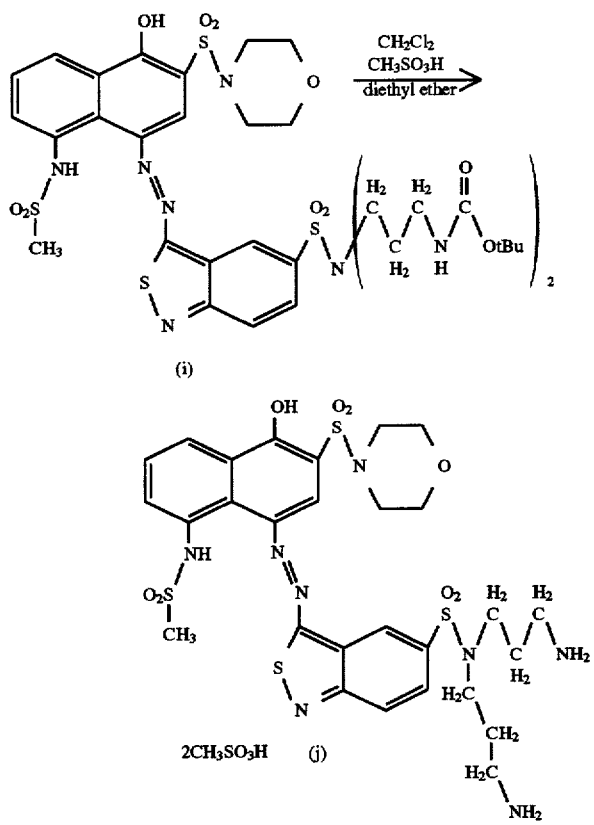

(i)

(j) 2CH₃SO₃H

Compound (i) (420 mg, 0.45 mmol) was dissolved in $CH_2Cl_2$ (10 mL), methane sulfonic acid (500 μl) was added, the reaction mixture stirred O/N at RT and then diluted with diethyl ether. The supernatant liquid was decanted and the residue, compound (j), was washed with diethyl ether and dried under high vacuum.

Compound (j) (0.45 mmol) was suspended in $CH_2Cl_2$ (10 mL), TEA (3 eq., 1.35 mmol) was added, followed by the dropwise addition of 3-(5,5'-dimethyl-N-n-octadecyl-thiazolidin-2'-yl)-4-hydroxy-phenyl sulfonyl chloride (TSC, 252 mg, 0.45 mmol, in $CH_2Cl_2$). Then, additional TEA (2 eq., 0.9 mmol) was added, followed by the dropwise addition of TSC (252 mg, 0.45 mmol, in $CH_2Cl_2$). The reaction was stirred for several h, the solvent was evaporated and the crude product was purified by silica gel chromatography using 10% MeOH/$CH_2Cl_2$ as the eluent. The yield of Compound (12) was 200 mg (25% yield from compound (i)). The $\lambda_{max}$=674 nm in MeOH. Mass spectroscopy and proton NMR were consistent with the proposed structure of compound (12).

EXAMPLE II

Preparation of Compound (13)

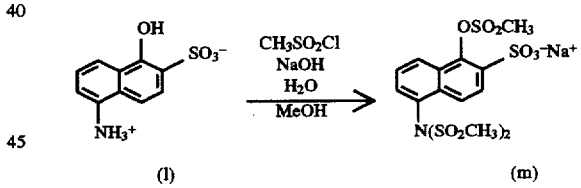

(l)               (m)

Compound (1), $C_{10}H_9NSO_4$, (225.42 g, 942.2 mmol) was suspended in $H_2O$ (500 mL) and the pH was adjusted to pH 7.5 with 50% NaOH (50 mL). Methane sulfonylchloride (300 mL, 444 g, 3.88 mmol, 4.1 eq.), additional 50% NaOH (an amount necessary to maintain pH 7.5) and $H_2O$ (300 mL) were added dropwise to the suspension over a 6 h period during which the in-pot temperature was held between 35°–40° C. The reaction was stirred O/N at RT. The suspension was vacuum filtered and rinsed with $H_2O$ (500 mL). The crude solid was slurried with MeOH (700 mL) for 1 h, recovered by vacuum filtration, pressed dry and dried in a heated vacuum dessicator for 30 h at 40° C. The dessicator-dried weight of compound (m), $C_{13}H_{14}NS_4O_{10}Na$, was 476.7 g (102.1% yield). Mass spectroscopy by FAB⁺ gave the expected molecular ion, m/e=495. Proton NMR (DMSO-$d_6$) was consistent with the proposed structure of compound (m). TLC (5% MeOH/$CH_2Cl_2$, $R_f$=0.05) was consistent with compound (m). Thermal gravimetric analysis (TGA) indicated clean melts at 298.9° C.

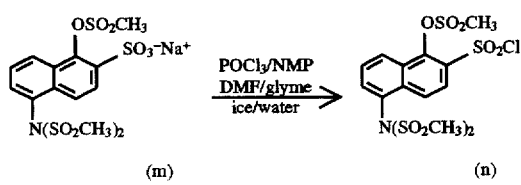

Compound (m) (125.12 g, 252.5 mmol) was dissolved/suspended in dry N-methyl pyrrolidinone (100 mL, 3 Å sieves) and ethylene glycol dimethyl ether (100 mL, monoglyme). As the suspension was stirred, dimethyl formamide (5 mL) was added, followed by the dropwise addition of phosphorous oxychloride (122 mL, 200.7 g, 1311 mmol, 5.2 eq.) over several h and then stirred O/N at RT under nitrogen. The reaction, as well as a $H_2O$ rinse of the reaction flask, were quenched onto ice (1 kg). The resulting suspension was vacuum filtered. The solids were rinsed with a $H_2O$/monoglyme solution (1:1 v/v, 500 mL), pressed dry, vacuum dried O/N at 40° C. and dried for an additional time period. The dried weight of compound (n), $C_{13}H_{14}NS_4O_9Cl$, was 102.9 g (82.9% yield). Mass spectroscopy by $FAB^+$ gave the expected molecular ion, m/e= 492. Proton NMR (DMSO-$d_6$) was consistent with the proposed structure of compound (n). TLC (5% MeOH/$CH_2Cl_2$, $R_f$=0.80) was consistent with compound (n).

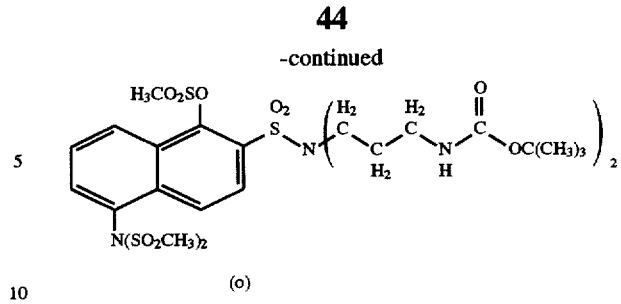

Compound (n) (44.07 g, 89.6 mmol) was suspended in acetone (500 mL) and then chilled to 5° C. The 'BOC linker (29.70 g, 89.6 mmol) in acetone (200 mL) containing TEA (15 mL, 10.9 g, 107.6 mmol) was added slowly to the chilled suspension over 30 min. An acetone rinse (100 mL) of the funnel was added to the chilled suspension which was stirred for 1 h, allowed to warm to RT and then stirred O/N at RT. The reaction liquor was vacuum filtered, the solid rinsed with acetone (200 mL) and the acetone filtrate (700 mL) concentrated (to 200 mL) using a rotoevaporator. TLC (5% MeOH/$CH_2Cl_2$, $R_f$=0.50) was consistent with compound (o).

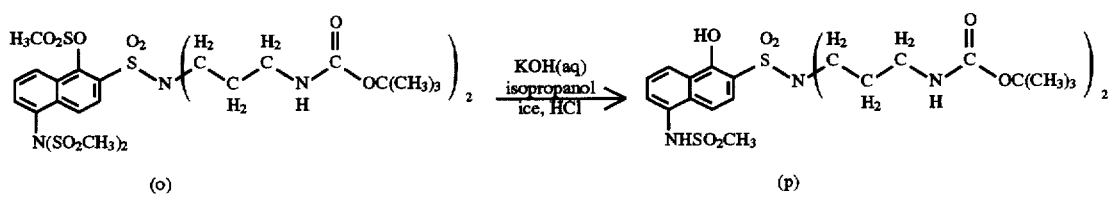

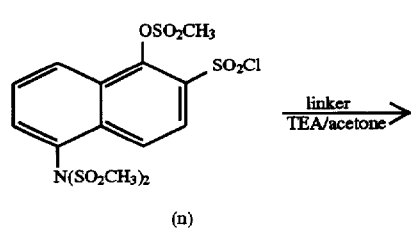

The concentrated acetone filtrate containing compound (o) (90.0 mmol) was diluted with isopropanol (300 mL), followed by 45% KOH (100 mL). As the reaction solution stirred, it was heated slowly up to reflux (70°–72° C.) and maintained this way O/N. The reaction solution was cooled to RT, quenched onto ice (500 g), slowly acidified with 12M HCl (100 mL) and separated into an aqueous layer and an oily residue. The aqueous layer was concentrated using a rotoevaporator and extracted with ethyl acetate, after which, the organic layers were combined, dried with anhydrous $MgSO_4$, filtered, rinsed and then concentrated using a rotoevaporator. TLC (2% MeOH/$CH_2Cl_2$) indicated no starting material ($R_f$=0.50) but rather a higher spot ($R_f$=0.85) consistent with compound (p), $C_{27}H_{42}N_4S_2O_9$. Proton NMR (DMSO-$d_6$) was consistent with the proposed structure of compound (p).

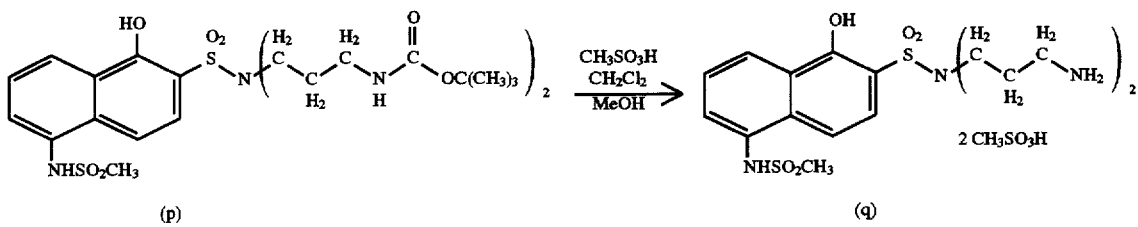

(p) → (q)

Compound (p) (90.0 mmol) was dissolved partially in CH$_2$Cl$_2$ (300 mL) and THF (100 mL) and then methanesulfonic acid (15 mL, 22.2 g, 231.2 mmol) was added as the solution stirred. After the bubbling ceased, additional methanesulfonic acid (15 mL) was added to the solution which was slowly heated to reflux, maintained at this temperature for 3 h and then cooled to RT. The cooled suspension was vacuum filtered and then gravity filtered O/N. The recovered solid was pressed dry, slurried in methanol (500 mL) for 1 h, vacuum filtered, rinsed and vacuum dried O/N at 30° C. The dried weight of compound (q), C$_{17}$H$_{26}$N$_4$S$_2$ 2 CH$_3$SO$_3$H, was 30.75 g (55% yield from compound (n)). Mass spectroscopy by FAB$^+$ gave the expected molecular ion, m/e=431 [M-2 CH$_3$SO$_3$H]. Proton NMR (DMSO-d$_6$) was consistent with the proposed structure of compound (q). TLC (20% MeOH/CH$_2$Cl$_2$, R$_f$=0.05) was consistent with compound (q). High performance liquid chromatography (HPLC) analysis indicated one peak material, 99.7 area % pure.

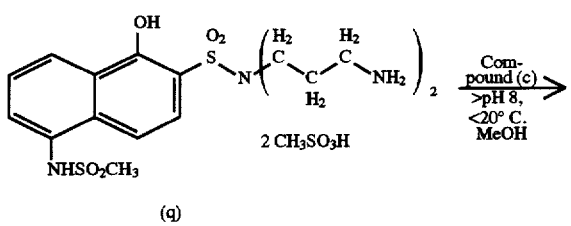

(q)

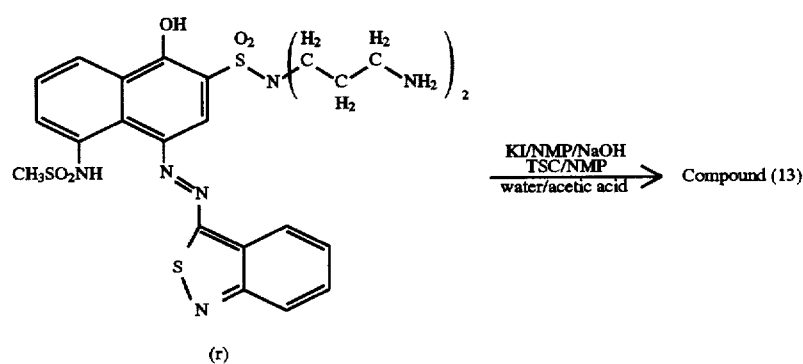

(r)

Compound (c) (4.55 g, 0.03 mol) was dissolved in 18M H$_2$SO$_4$ (40 mL) and the solution, "solution A," was cooled to between 0°–5° C. Solution A was vigorously stirred as NaNO$_2$ (2.3 g, 0.033 mol) was slowly added and then stirred for 1 h at 0° C. Compound (q) (18.69 g, 0.0316 mol) and potassium acetate (150 g) were dissolved in H$_2$O (150 mL). The solution, "solution B," was cooled to 0° C. by the addition of ice until the volume was 250 mL and then vigorously stirred as solution A was added dropwise. Throughout the addition of solution A to solution B, the pH of the mixture was maintained above pH 8 and the temperature of the mixture was maintained below 20° C. The precipitate was filtered off, washed with brine, dried, taken up in dry MeOH and the insoluble material removed. After concentrating the solution, the resultant solid was washed with ethyl acetate and then dried. The dried weight of compound (r) was 18 g (physical yield of 101.4%).

TSC (26.47 g in 50 mL NMP) was added at RT to a vigorously stirred solution of Compound (r) (0.023 mol, 14 g in 50 mL NMP containing 0.1 g KI) and 50% NaOH/H₂O (4 mL). The reaction mixture was stirred O/N, poured into ice-cold H₂O (500 mL containing 20 mL CH₃COOH), its pH adjusted to pH 5.5–6 and the resulting precipitate immediately filtered off. The crude product, compound (13), was purified, when necessary, by chromatography on silica gel (CH₂Cl₂:MeOH, 9:1) and recrystallized from petroleum ether or hexane. (yield: 5 g of compound (13) from 40% pure starting material).

EXAMPLE III

Preparation of Compound (14)

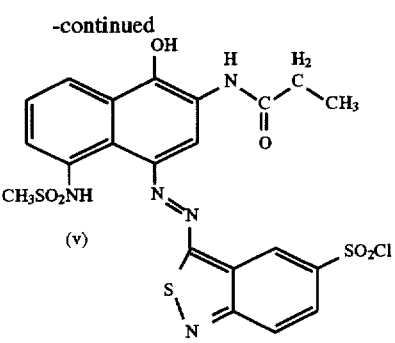

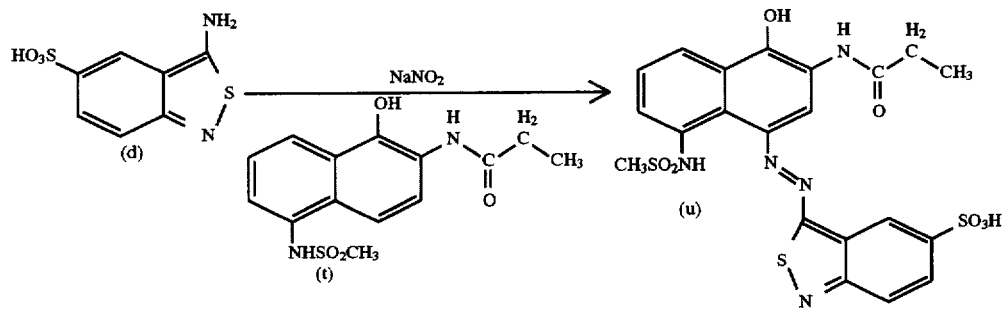

Phosphorous oxychloride (20 mL, 214 mmol) and dimethylacetamide (DMAC, 2 mL) were added to a stirred A solution of compound (d) (12 g, 52 mmol) and NaNO₂ (69 mmol, 4.3 g in 200 mL 5% NaOH (aq)) was added dropwise over 30 min to a 0° C. solution of 10% HCl (aq) (200 mL). The reaction mixture was stirred for 3 h at 0° C., added dropwise to a 0° C. solution of compound (t) (27 mmol, 8 g in 150 mL 10% NaOH₍ₐq₎), stirred for 3 h at 25° C. and then added to a 0° C. mixture of saturated NaCl(aq) (100 mL) and 18M H₂SO₄ (50 mL). The precipitated solids were collected by suction filtration, washed with saturated NaCl (2×75 mL) and air-dried. The isolated product was triturated with hot ethyl acetate (2×100 mL) whereupon the remaining solids were air-dried. The dried weight of compound (u) was 16 g.

solution of compound (u) (15 g in 100 mL acetonitrile and 20 mL sulfolane). The reaction mixture was heated for 3 h at 80° C., cooled to 0° C. and then quenched by the dropwise addition of ice-cold H₂O (200 mL). The precipitated solids were collected by suction filtration, washed with 0.1N H₂SO₄ (100 mL) and air-dried. The dried weight of compound (v) was 8.6 g (56% yield from compound (d)).

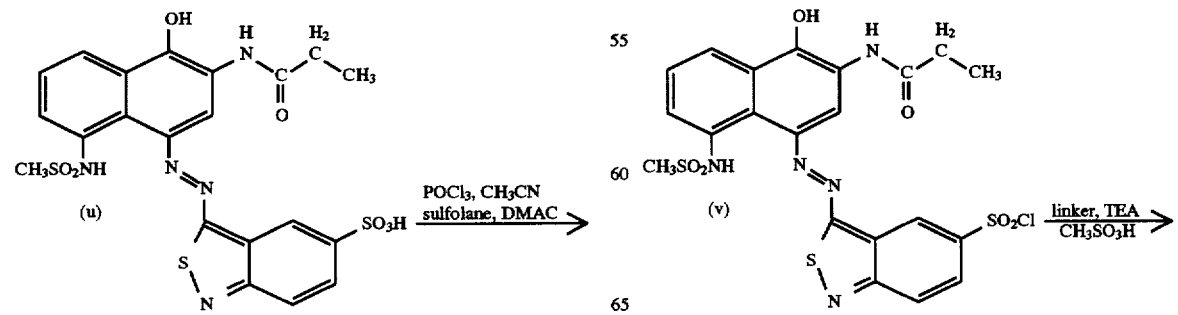

EXAMPLE IV

Preparation of Compound (15)

The ᵗBOC linker (7 g, 21 mmol) was added to a stirred suspension/solution of compound (v) (15 mmol, 8.6 g in 150 mL anhydrous THF) and, 5 min later, TEA (7 mL, 50 mmol) was added dropwise. The reaction mixture was stirred for 3 h at 40° C. and then cooled to 0° C. Methanesulfonic acid (20 mL, 310 mmol) was added dropwise and the reaction was stirred for 6 h at 50° C. The resultant slurry was diluted with ethyl acetate (300 mL). The solids were collected by suction filtration, washed with anhydrous acetone (2×100 mL) and hexanes (2×100 mL) and then air-dried to yield compound (x).

TSC (16 g, 27 mmol) and NaHCO₃ (s) (15 g, 178 mmol) were added to a suspension of compound (x) in dichloromethane/acetonitrile (1:1, 300 mL). Fifteen min later, TEA (25 mL, 180 mmol) was added dropwise and the solution was stirred O/N at RT. The reaction mixture was concentrated in vacuo. The residue was dissolved in ethyl acetate and extracted with 2M K₂CO₃ (aq) (100 mL) and 0.1N H₂SO₄ (aq) (100 mL). The organic phase was dried over MgSO₄, filtered and concentrated in vacuo. The residue was purified by flash chromatography using ethyl acetate and THF/hexanes (1:1) as eluents to give 950 mg of compound (14). Proton NMR (DMSO-d₆) was consistent with the proposed structure of compound (14).

Compound (c) (2.5 g, 16.66 mmol) is added slowly to a solution of NaNO₂ (1.5 g in 18 mL of 18M H₂SO₄) at a temperature of below 5° C., stirred for 2 h while maintaining that temperature and poured into a chilled solution of 2-(morpholinosulfamoyl)-5(3-sulfobenzene)sulfonamido-1- naphthol, i.e., compound (z), (52 g compound (z) in 300 mL 50% NaOH (MeOH) and 50 mL H₂O). The precipitate was filtered off, washed with H₂O, air-dried, triturated with THF and dried. The dry weight of compound (a') was 1.5 g. The NMR and mass spectra were consistent with the proposed structure of compound (a').

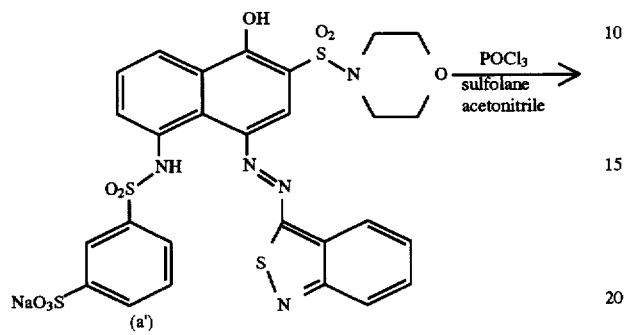

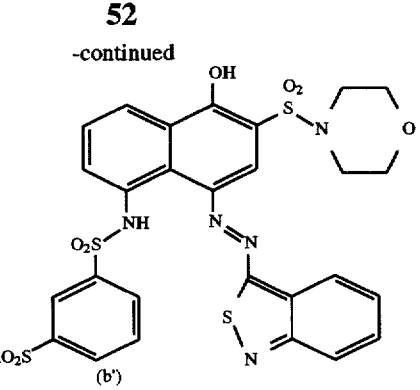

After POCl₃ (2.5 mL) was added to a solution of compound (a') (2.17 mmol, 1.5 g in 15 mL sulfolane and 10 mL acetonitrile), the mixture was stirred O/N at RT, poured onto ice (300 mL), filtered, washed with H₂O and air-dried. The dry weight of compound (b') was 1.3 g. The NMR and mass spectra were consistent with the proposed structure of compound (b').

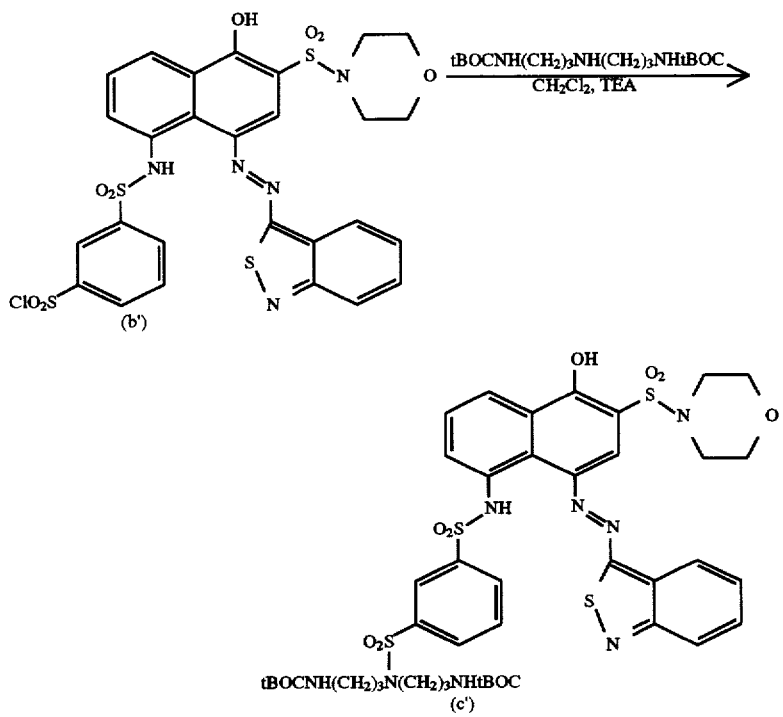

TEA (184 mg, 1.83 mmol) was added to a solution of compound (c') (1.83 mmol, 1.3 g in 25 mL CH₂Cl₂). Next, tBOC linker (600 mg) was added and the mixture was stirred for several hours at RT. The reaction mixture was then washed with H2O, dried over Na₂SO₄, filtered and the solvent removed under vacuum. The crude product was purified by chromatography on silica gel using 10% MeOH:CH₂Cl₂ as eluent to yield 500 mg of compound (c'). The NMR and mass spectra were consistent with the proposed structure of compound (c').

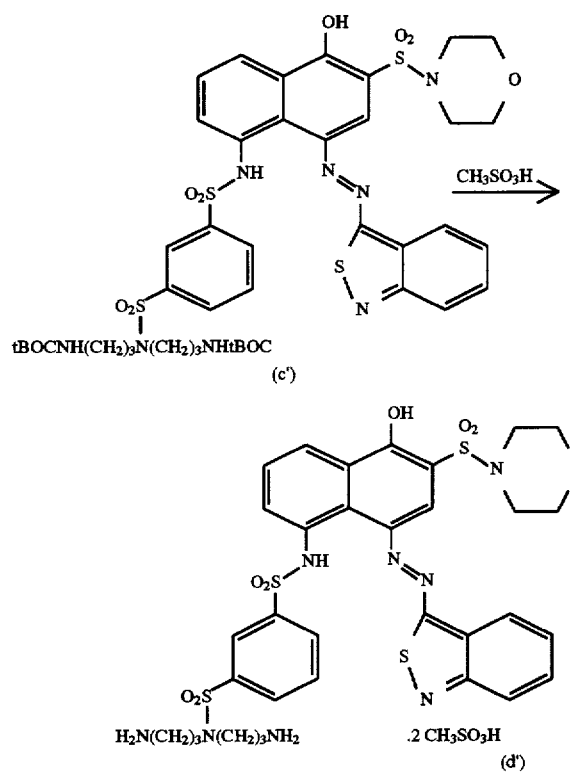

(c')

(d')

Compound (c') (500 mg) was dissolved in CH₂Cl₂ (15 mL), treated with methane sulfonic acid (1.0 mL) and incubated for 4 h at RT. The reaction mixture was diluted with diethyl ether. The solid was filtered off, washed with ether and air-dried. The air-dried weight of compound (d') was 560 mg. The NMR and mass spectra were consistent with the proposed structure of compound (d').

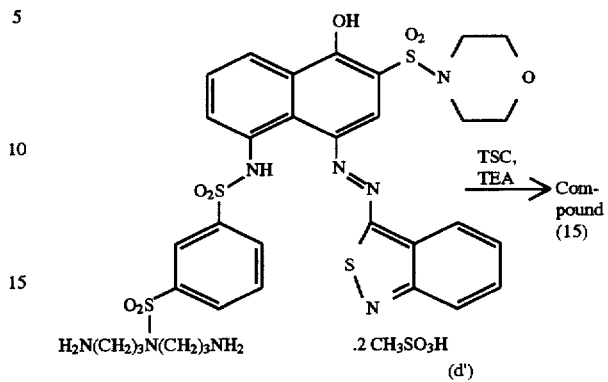

(d')

TEA (252 mg, 2.5 mmol) was added to a solution of compound (d') (0.5 mmol, 545 mg in 25 mL CH₂Cl₂). TSC (s) (450 mg, 2.5 mmol) was added. The solution was stirred for 30 min at RT. Additional TSC (s) (100 mg) was added. The solution was stirred for 60 min at RT. The solvent was removed under vacuum, the residue purified by column chromatography on silica gel using 10% MeOH:CH₂Cl₂ as the eluent to yield 480 mg of compound (15). The NMR and mass spectra were consistent with the proposed structure of compound (15).

EXAMPLE V

Preparation of Compound (16)

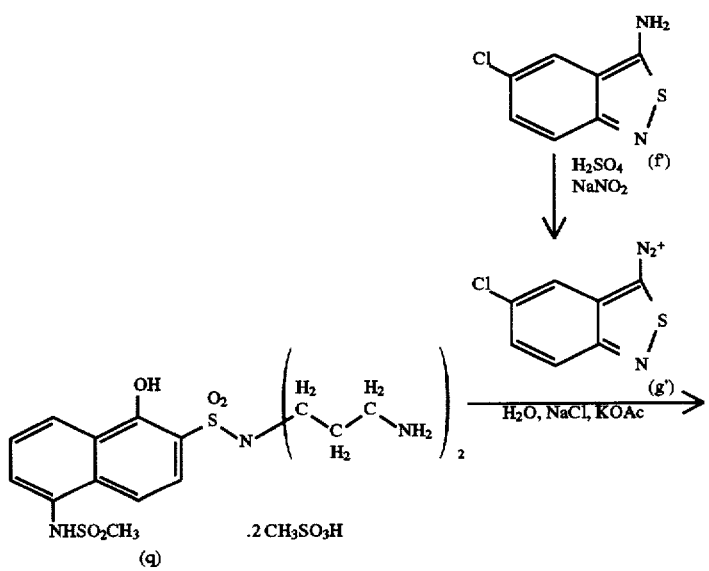

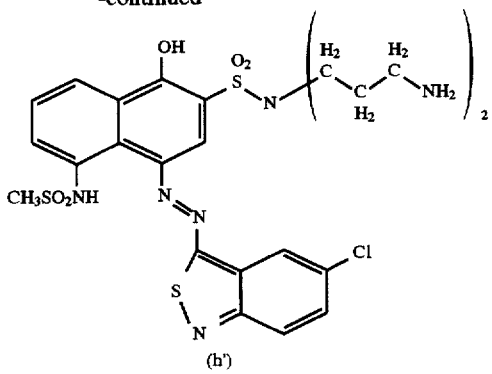

(h')

Solution C was prepared by dissolving compound (q) (0.01 mol) in a saturated NaCl solution (100 mL), adding 50% NaOH (5 mL) and potassium acetate (25 g) and then, cooling the solution to about 0° C. to 5° C. Solution D was prepared by dissolving compound (f') (1.84 g, 0.01 mol, 2-amino-5-chloro-2,1-isobenzothiazole) in 18M $H_2SO_4$ (15 mL), gradually adding $NaNO_2$ (0.7 g, 0.01 mol) and then, stirring for 30 min. Solution D was slowly added to Solution C, the precipitate filtered off and dried to yield compound (h').

image dye-providing compound comprising the subject cyan chromophore. The three film units were identical but for their image dye-providing compound, i.e., either compound (13), (14) or (15) was used in a particular film unit.

The image-receiving elements used in these "peel-apart" film units comprised a white-pigmented polyethylene-coated opaque photographic film support having coated thereon in succession:

1. a polymeric acid-reacting layer coated at a coverage of about 23,155 mg/m² comprising a 1.2/1 ratio of AIR-

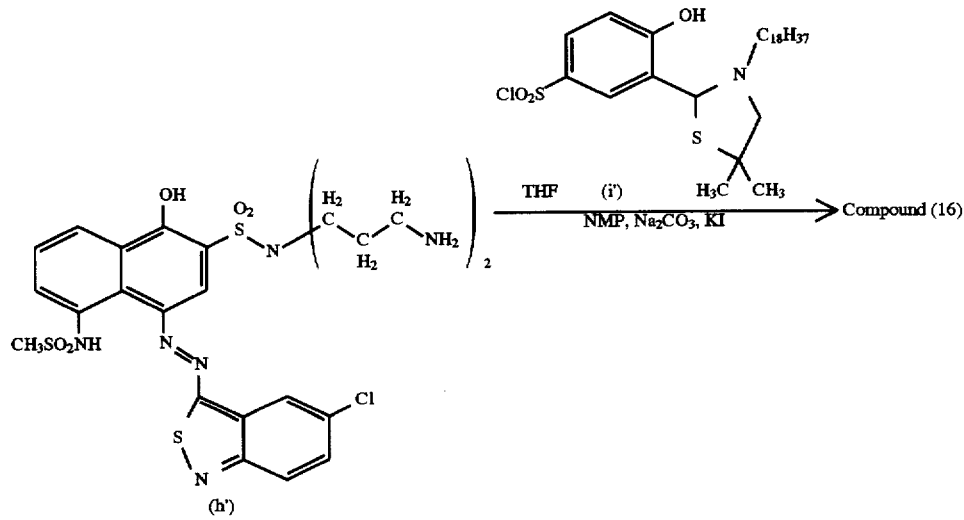

Compound (h') (3.1 g, 0.005 mol) was dissolved in NMP (20 mL, containing 5 g $Na_2CO_3$ and a catalytic amount of KI), compound (i') (0.01 mol, 5.59 g in 50 mL THF) added slowly (30 min.), stirred for 2 h, poured into ice-cold $H_2O$, the pH adjusted to about pH 5 and, the precipitate was filtered off, dissolved in THF and dried over magnesium sulfate. The precipitate was purified on a silica gel column ($CH_2Cl_2$:$CH_3OH$, 10:1) to yield compound (16) (1.89 g). The NMR and mass spectra were consistent with the proposed structure of compound (16).

EXAMPLE VI

Image-Recording Elements

A. Three diffusion transfer photographic film units were prepared according to the invention which included an FLEX™ 465 (a vinyl acetate ethylene latex from Air Products Co.) and GANTREZ™ S-97 (a free acid of a copolymer of methyl vinyl ether and maleic anhydride from GAF Corp.);

2. a timing layer coated at a coverage of about 6456 mg/m² comprising 3 parts of a copolymer of diacetone acrylamide and acrylamide grafted onto polyvinyl alcohol and 1 part of an aqueous polymeric emulsion, i.e., aliphatic polyester urethane polymer commercially available under the tradename Bayhydrol PU-402A (Bayer);

3. an image-receiving layer coated at a coverage of about 3228 mg/m² comprising: 2 parts of a terpolymer comprising vinylbenzyltrimethylammonium chloride, vinylbenzyltri-ethylammonium chloride and vinylbenzyldimethyldodecy-lammonium chloride (6.7/2.3/1 weight %, respectively) and 1 part AIRVOL™ 425 (a fully hydrolyzed polyvinyl alcohol from Air Products Co.); and 4. a strip coat layer coated at a coverage of about 161 mg/m² comprising about 40% by weight of a terpolymer of acrylic acid, hydroxypropyl methacrylate and 4-vinylpyrrolidone and about 60% by weight of carboxymethyl guar.

Diffusion transfer photographic film units which can include the polyester urethane polymer in layer 2 above are described and claimed in commonly-assigned U.S. patent application Ser. No. 08/645,803 filed on May 14, 1996 now U.S. Pat. No. 5,593,810.

The photosensitive elements utilized in these diffusion transfer photographic film units comprised a gelatin sub-coated transparent 4 mil polyester film base (available from Dupont) having coated thereon in succession the following layers:

1. a cyan dye-providing material layer comprising the cyan dye-providing compound represented by either (13) at about 677 mg/m², (14) at about 462 mg/m² or (15) at about 581 mg/m², about 807 mg/m² of gelatin and about 107 mg/m² of 6-butylthiomethyluracil;

2. a red-sensitive silver iodobromide layer comprising about 269 mg/m² of silver iodobromide (1.6 μm, unsensitized, 6 mole % iodine) and about 807 mg/m² of gelatin;

3. a layer comprising about 807 mg/m² of gelatin and about 753 mg/m² of aminoreductone; and, 4. a layer comprising about 538 mg/m² of gelatin and 53 mg/m² of succinaldehyde.

Each film unit was prepared utilizing the image-receiving element and a photosensitive element comprising either compound (13), (14) or (15) as described above. After photoexposure of the photosensitive element, the image-receiving element and the photosensitive element were arranged in face-to-face relationship, i.e. (with their respective supports outermost) and a rupturable container containing an aqueous alkaline processing composition was affixed between the image-receiving and photosensitive elements at the leading edge of each film unit such that the application of compressive pressure to the container would rupture the seal of the container along its marginal edge and distribute the contents uniformly between the respective elements. The chemical composition of the aqueous alkaline processing composition utilized for the processing of the film unit is set forth in Table I.

TABLE I

| COMPONENT | PARTS BY WEIGHT |
| --- | --- |
| hypoxanthine | 0.98 |
| 1-methylimidazole | 0.29 |
| guanine | 0.15 |
| potassium hydroxide | 8.55 |
| p-hydroxyphenylmercaptotetrazole | 0.005 |
| bis-6-methylaminopurine | 0.03 |
| titanium dioxide | 0.20 |
| 6-methyluracil | 0.54 |
| pentanolamine | 1.96 |
| hydrophobically modified HEC | 3.36 |
| 1,2,4-triazole | 0.35 |

TABLE I-continued

| COMPONENT | PARTS BY WEIGHT |
| --- | --- |
| phehylmercaptotetrazole | 0.004 |
| 2,3-cyclohexeno-1-ethylpyridinium tosylate | 2.40 |
| water | Balance to 100 |

Diffusion transfer photographic film units which can include 2,3-cyclohexeno-1-ethylpyridinium tosylate in the processing composition as described above are disclosed and claimed in commonly-assigned U.S. patent application Ser. No. 08/599,296 filed on Feb. 9, 1996 now abandoned in favor of copending commonly assigned U.S. patent application Ser. No. 08/755,702 filed on Nov. 25, 1996.

After exposure, the film unit was passed through a pair of rollers set at a gap spacing of about 0.0034 inch (0.0864 mm) and, after an imbibition period of 90 seconds, the photosensitive and image-receiving elements were separated from each other.

The maximum reflection density ($D_{max}$) and the minimum density ($D_{min}$) of the resulting image were measured using a reflection densitometer (MacBeth, model RD 514) and are reported in TABLE III.

B. Four diffusion transfer photographic film units were prepared according to the invention which included an image dye-providing compound comprising the subject cyan chromophore. The four film units were identical but for their image dye-providing compound, i.e., either compound (12), (13), (14) or (15) was used in a particular film unit.

The image-receiving elements used in these "peel-apart" film unit comprised a white-pigmented polyethylene-coated opaque photographic film support having coated thereon in succession:

1. an image-receiving layer comprising: a copolymer comprising about 3228 mg/m² of 3 parts of 4-vinylpyridine and 1 part of vinylbenzyltrimethyl-ammonium chloride grafted onto hydroxyethyl cellulose and about 53.8 mg/m² of diepoxy;

2. a layer comprising about 807 mg/m² of gum arabic; and, 3. a layer comprising about 5111 mg/m² of guanidine picolinate, about 1076 mg/m² of gelatin and about 129 mg/m² succinaldehyde.

The photosensitive elements utilized in this diffusion transfer photographic film unit comprised a gelatin sub-coated transparent 4 mil polyester film base (available from Dupont) having coated thereon in succession the following layers:

1. a cyan dye-providing material layer comprising the cyan dye-providing compound represented by either (12) at about 559 mg/m², (13) at about 677 mg/m², (14) at about 462 mg/m² or (15) at about 581 mg/m²; about 807 mg/m² of gelatin and about 107 mg/m² of 6-butylthiomethyluracil;

2. a layer comprising about 807 mg/m² of gelatin and about 753 mg/m² of aminoreductone;

3. a red-sensitive silver iodobromide layer comprising about 247 mg/m² of silver bromide (0.2 μm, unsensitized) and about 807 mg/m² of gelatin;

4. a layer comprising about 1398 mg/m² of zinc oxide and about 699 mg/m² of gelatin; and, 5. a layer comprising about 129 mg/m² of succinaldehyde.

The four fill units were prepared utilizing the image-receiving element and a photosensitive element comprising either compound (12), (13), (14) or (15) as described above. After photoexposure, the photosensitive element was dipped in water, laminated with the image-receiving sheet, heated in a waffle iron for 30 seconds at 90° C. and, the photosensitive and image-receiving elements were separated from each other. The $D_{max}$ and $D_{min}$ values of the resulting image are reported in TABLE III.

C. Four diffusion transfer photographic film units were prepared according to the invention which included an image dye-providing compound comprising the subject cyan chromophore. The four film units were identical but for their image dye-providing compound, i.e., either compound (13), (14), (15) or (16) was used in a particular fill unit.

The image-receiving element used in these integral film units comprised a gelatin subcoated transparent 4 mil polyester film base (available from Dupont) having coated thereon: an image-receiving layer coated at a coverage of about 2474 mg/m² comprising: 2 parts of a terpolymer comprising vinylbenzyltrimethylammonium chloride, vinylbenzyltriethylammonium chloride and vinylbenzyldimethyldodecylammonium chloride (6.7/2.3/1 weight %, respectively) and 1 part of gelatin.

The photosensitive elements utilized in these diffusion transfer photographic film unit comprised a gelatin subcoated transparent 4 mil polyester film base (available from Dupont) having coated thereon in succession the following layers:

1. a polymeric acid-reacting layer coated at a coverage of about 32,280 mg/m² comprising a 1.2/1 ratio of AIRFLEX™ 465 (a vinyl acetate ethylene latex from Air Products Co.) and GANTREZ™ S-97 (a free acid of a copolymer of methyl vinyl ether and maleic anhydride from GAF Corp.);

2. a timing layer coated at a coverage of about 6456 mg/m² comprising 3 parts of a copolymer of diacetone acrylamide and acrylamide grafted onto polyvinyl alcohol and 1 part of an aqueous polymeric emulsion, i.e., aliphatic polyester urethane polymer commercially available under the tradename Bayhydrol PU-402A (Bayer);

3. a cyan dye-providing material layer comprising the cyan dye-providing compound represented by either compound (13) at about 677 mg/m², (14) at about 462 mg/m², (15) at about 581 mg/m² or (16) at about 667 mg/m², about 807 mg/m² of gelatin and about 107 mg/m² of 6-butylthiomethyluracil;

4. a red-sensitive silver iodobromide layer comprising about 269 mg/m² of silver iodobromide (1.6 µm, unsensitized, 6 mole % iodine) and about 807 mg/m² of gelatin;

5. a layer comprising about 807 mg/m² of gelatin and about 753 mg/m² of aminoreductone; and, 6. a layer comprising about 538 mg/m² of gelatin and 53 mg/m² of succinaldehyde.

The monochrome film units were prepared utilizing the image-receiving element and a photosensitive element comprising either compound (13), (14), (15) or (16) as described above. After exposure, the film unit was processed against the image-receiving sheet by passing the film unit through a pair of rollers set at a gap spacing of about 0.028 mm whereupon a rupturable container containing an aqueous alkaline processing composition which was affixed between the image-receiving and photosensitive elements at the leading edge of each film unit was ruptured and the contents of the ruptured container distributed uniformly between the respective elements. The chemical composition of the aqueous alkaline processing composition utilized for the processing of the film unit is set forth in Table II.

TABLE II

| COMPONENT | PARTS BY WEIGHT (g) |
|---|---|
| potassium hydroxide | 6.0 |
| titanium dioxide | 41.5 |
| colloidal silica | 0.6 |
| 6-methylthiomethyluracil | 2.0 |
| opacification dye (compound (23)) | 2.0 |
| 3-4-hydroxy-1'-phenanthryl)-3-(3"-carboxy-4"-hydroxy-7"-n-docasanyloxy-1"-naphthalide) | |
| water | 45.9 | wherein compound (23) is represented by the following structural formula:

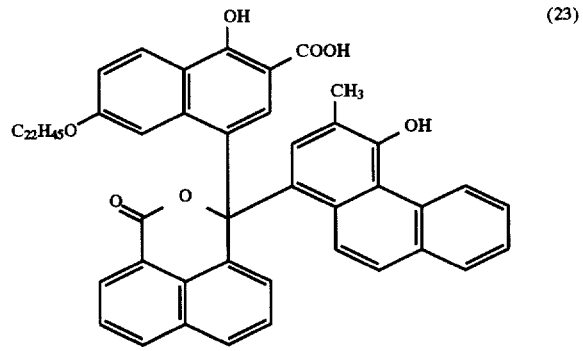

The $D_{max}$ and $D_{min}$ values of the resulting image are reported in TABLE III.

TABLE III

| Com- | | Film Unit A | | Film Unit B | | Film Unit C | |
|---|---|---|---|---|---|---|---|
| pound | Coverage (mg/m2) | $D_{max}$ | $D_{min}$ | $D_{max}$ | $D_{min}$ | $D_{max}$ | $D_{min}$ |
| (13) | 677 | 1.50 | 0.12 | 2.25 | 0.14 | 2.10 | 0.13 |
| (14) | 462 | 0.80 | 0.17 | 1.40 | 0.17 | 1.30 | 0.14 |
| (15) | 581 | 1.15 | 0.14 | 1.75 | 0.11 | 1.80 | 0.11 |
| (12) | 559 | NT | NT | 1.50 | 0.12 | NT | NT |
| (16) | 667 | NT | NT | NT | NT | 0.65 | 0.13 | wherein NT is not tested.

It can be seen from the red $D_{max}$ values in Table III that the use of a higher potential developer, i.e., aminoreductone, in the image-recording materials of the present invention not only allowed sufficient cyan chromophore to diffuse to the image-receiving layer to provide an acceptable photograph, but also, resulted in no appreciable reduction of the 3-benzoisothiazole moiety of the novel naphthol azo cyan dye which would have manifested itself as, e.g., an undesirable discoloration of the resultant photograph.

In addition to the beneficial effects described above, the use of the novel image-recording materials of the present invention yields photographic images which are relatively lightfast and exhibit a minimal absorption in the green and blue spectral regions resulting in excellent hue characteristics.

Although the invention has been described in detail with respect to various preferred embodiments thereof, those skilled in the art will recognize that the invention is not limited thereto but rather that variations and modifications can be made which are within the spirit of the invention and the scope of the appended claims.

What is claimed is:

1. An image-recording material comprising one or more supports and carried by a support:

a source of silver ions;

an image-receiving layer; and an image dye-providing compound represented by the formula

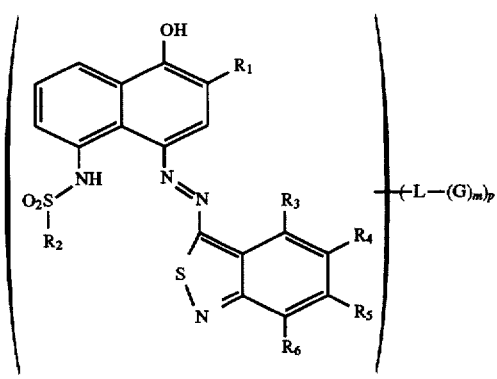

wherein:

G is a diffusion control moiety;

m is 1 or 2;

L is a covalent bond or a divalent linking group;

p is 1, 2 or 3;

$R_1$ is:

(1) $SO_2NR_7R_8$ wherein $R_7$ and $R_8$ are independently: hydrogen; linear or branched alkyl ($C_nH_{2n+1}$) wherein n is an integer from 1 to 6; alkyl substituted with a photographically-acceptable substituent; cycloalkyl; benzyl; phenyl; phenyl substituted with a photographically-acceptable substituent; a heterocyclic group; a heterocyclic group substituted with a photographically-acceptable substituent; taken together, along with the nitrogen atom to which they are attached, form a 5- or 6-membered ring; or, taken together, are -(L-(G)$_m$); or (2) $R_9NCOR_{10}$ wherein $R_9$ is hydrogen; alkyl having from 1 to 6 carbon atoms; or, alkyl substituted with a photographically-acceptable substituent; and $R_{10}$ is hydrogen; alkyl having from 1 to 6 carbon atoms; alkyl substituted with a photographically-acceptable substituent; cycloalkyl; benzyl; phenyl; phenyl substituted with a photographically-acceptable substituent; a heterocyclic group; a heterocyclic group substituted with a photographically-acceptable substituent; or, -(L-(G)$_m$); and $R_2$ is alkyl having from 1 to 6 carbon atoms; alkyl substituted with a photographically-acceptable substituent; benzyl; phenyl; phenyl substituted with a photographically-acceptable substituent; or, -(L-(G)$_m$); and $R_3$, $R_5$ and $R_6$ are independently hydrogen; halogen; alkyl having from 1 to 4 carbon atoms; or, -(L-(G)$_m$); and $R_4$ is hydrogen; halogen; alkyl having from 1 to 4 carbon atoms; sulfamoyl; carboxy; carbamoyl; carboxylic ester; sulfo; alkylsulfonyl; phenylsulfonyl; or, -(L-(G)$_m$);

provided that at least one of $R_7$ and $R_8$, $R_{10}$, $R_2$ to $R_6$ is -(L-(G)$_m$).

2. An image-recording material as defined in claim 1 wherein said source of silver ions is a silver salt oxidizing material.

3. An image-recording material as defined in claim 1 wherein said source of silver ions is a photosensitive silver halide emulsion.

4. An image-recording material as defined in claim 3 further including a reducing agent and a binder.

5. An image-recording material as defined in claim 4 further including a base-releasing precursor and a silver salt oxidizer.

6. An image-recording material as defined in claim 3 wherein said photosensitive silver halide emulsion is a red-sensitive silver halide emulsion.

7. An image-recording material as defined in claim 6 further including a green-sensitive silver halide emulsion layer having a magenta image dye-providing compound associated therewith and/or a blue-sensitive silver halide emulsion layer having a yellow image dye-providing compound associated therewith.

8. An image-recording material as defined in claim 1 wherein $R_1$ is $SO_2NR_7R_8$.

9. An image-recording material as defined in claim 8 wherein $R_3$, $R_5$ and $R_6$ are hydrogen and $R_4$ is selected from the group consisting of hydrogen, chlorine and -SO$_3$H.

10. An image-recording material as defined in claim 1 wherein $R_1$ is $R_9NCOR_{10}$.

11. An image-recording material as defined in claim 10 wherein $R_3$, $R_5$ and $R_6$ are hydrogen and $R_4$ is selected from the group consisting of hydrogen, chlorine and -SO$_3$H.

12. An image-recording material as defined in claim 1 wherein G is selected from the group consisting of a hydroquinonyl developer group, a precursor thereof and a thiazolidine moiety.

13. An image-recording material as defined in claim 12 wherein G is

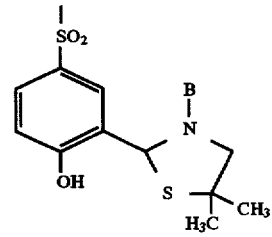

wherein B is a ballast group.

14. An image-recording material as defined in claim 13 wherein said image dye-providing compound is selected from the group consisting of:

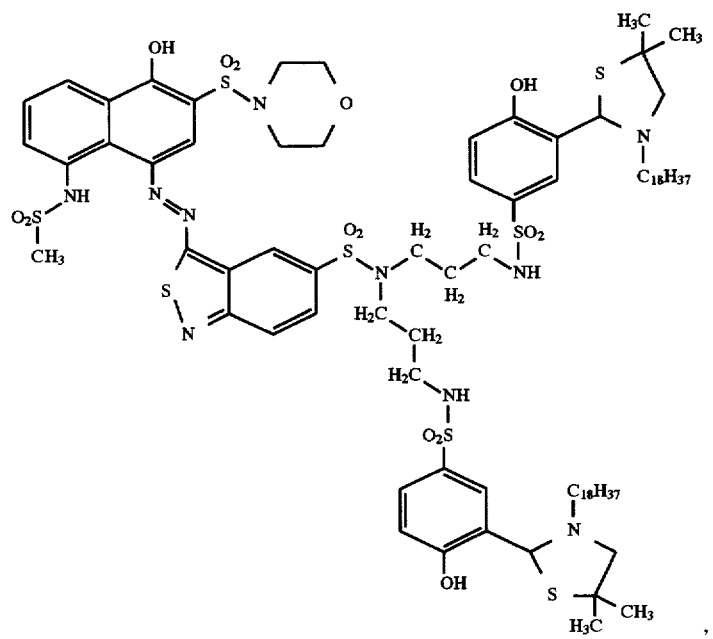
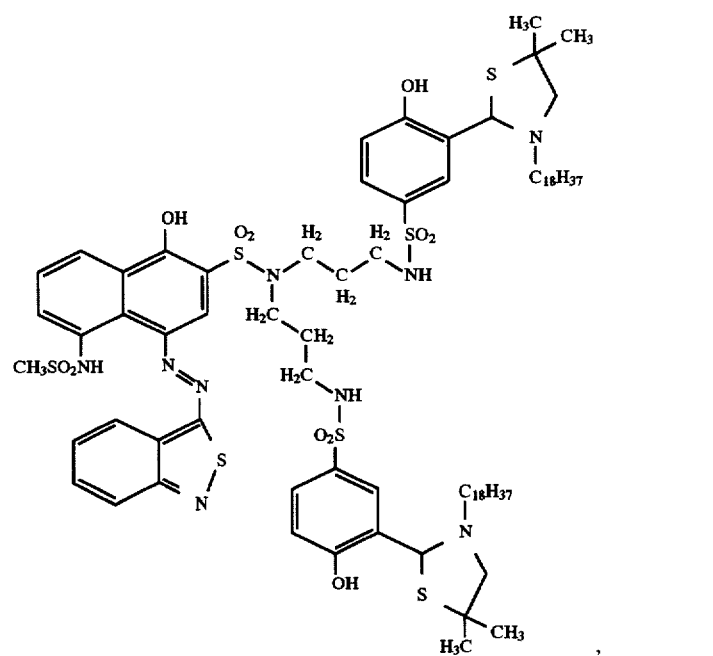

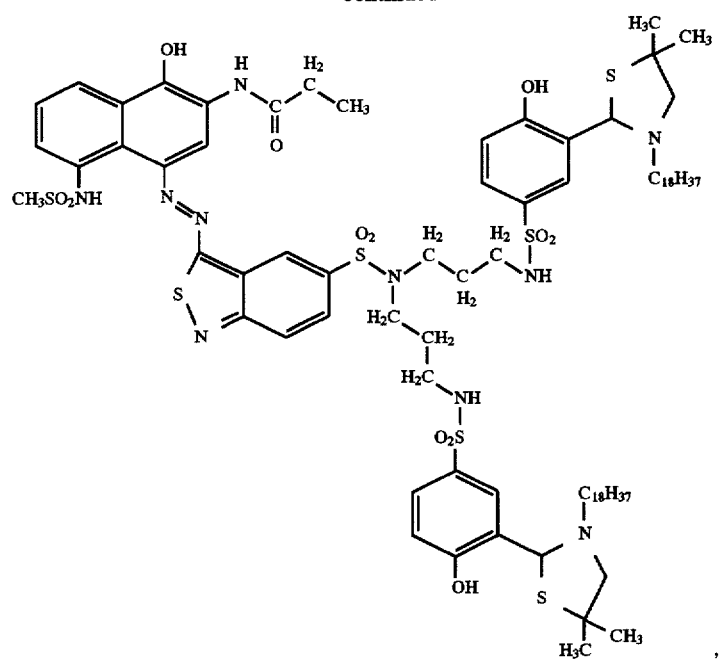
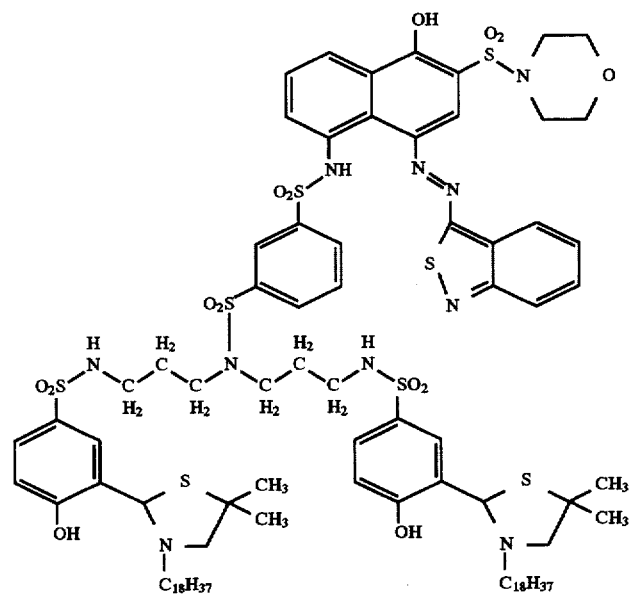
and

-continued

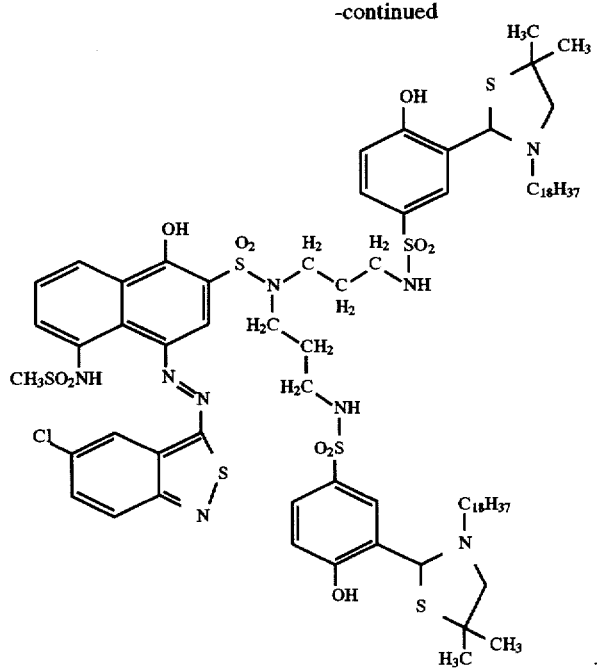

15. An image-recording material as defined in claim 12 wherein G is

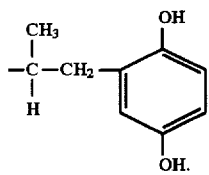

16. An image-recording material as defined in claim 15 wherein said image dye-providing compound is selected from the group consisting of:

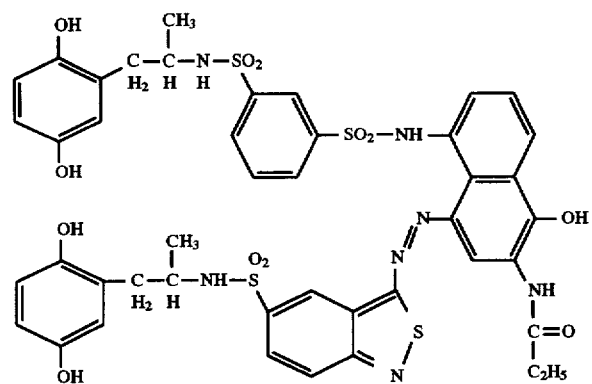

and

-continued

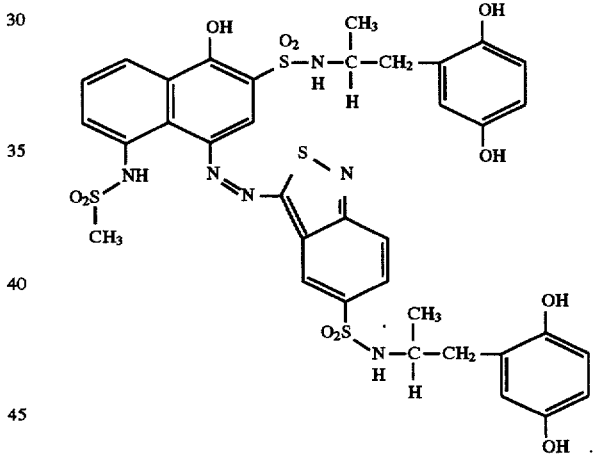

17. An image-recording material as defined in claim 7 further including means providing an aqueous processing composition for initiating development of said red-sensitive silver halide emulsion after photoexposure to form an image on said image-receiving layer.

18. An image-recording material comprising:

a photosensitive element comprising a support carrying a red-sensitive silver halide emulsion layer;

a second sheet-like element which is superposed or superposable on said photosensitive element;

an image-receiving layer positioned in one of said photosensitive or second sheet-like elements;

a reducing agent;

a binder;

an image dye-providing compound represented by the formula

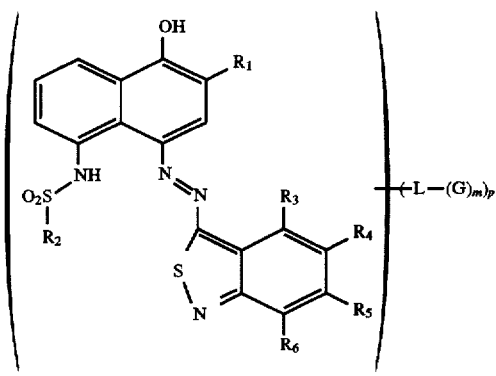

wherein:

G is a diffusion control moiety;

m is 1 or 2;

L is a covalent bond or a linking group;

p is 1, 2 or 3;

$R_1$ is:
(1) $SO_2NR_7R_8$ wherein $R_7$ and $R_8$ are independently: hydrogen; linear or branched alkyl $(C_nH_{2n+1})$ wherein n is an integer from 1 to 6; alkyl substituted with a photographically-acceptable substituent; cycloalkyl; benzyl; phenyl; phenyl substituted with a photographically-acceptable substituent; a heterocyclic group; a heterocyclic group substituted with a photographically-acceptable substituent; taken together, along with the nitrogen atom to which they are attached, form a 5- or 6-membered ring; or, taken together, are $-(L-(G)_m)$; or
(2) $R_9NCOR_{10}$ wherein: $R_9$ is hydrogen; alkyl having from 1 to 6 carbon atoms; or, alkyl substituted with a photographically-acceptable substituent; and $R_{10}$ is hydrogen; alkyl having from 1 to 6 carbon atoms; alkyl substituted with a photographically-acceptable substituent; cycloalkyl; benzyl; phenyl; phenyl substituted with a photographically-acceptable substituent; a heterocyclic group; a heterocyclic group substituted with a photographically-acceptable substituent; or, $-(L-(G)_m)$; and $R_2$ is alkyl having from 1 to 6 carbon atoms; alkyl substituted with a photographically-acceptable substituent; benzyl; phenyl; phenyl substituted with a photographically-acceptable substituent; or, $-(L-(G)_m)$; and $R_3$, $R_5$ and $R_6$ are independently: hydrogen; halogen; alkyl having from 1 to 4 carbon atoms; or, $-(L-(G)_m)$; and $R_4$ is hydrogen; halogen; alkyl having from 1 to 4 carbon atoms; sulfamoyl; carboxy; carbamoyl; carboxylic ester; sulfo; alkylsulfonyl; phenylsulfonyl; or, $-(L-(G)_m)$; and means for providing an aqueous alkaline processing composition for initiating development of said red-sensitive silver halide emulsion after photoexposure to form an image on said image-receiving layer;

provided that at least one of $R_7$ and $R_8$, $R_{10}$, $R_2$ to $R_6$ is $-(L-(G)_m)$.

19. A photographic method comprising the steps of exposing the photosensitive element as defined in claim 18 and developing said exposed photosensitive element with an aqueous alkaline processing composition, whereby a color image is formed.

20. A photographic method according to claim 19 wherein following said development, said photosensitive element and said second element are separated from one another.

21. A photographic method according to claim 19 wherein following said development, said photosensitive element and said second element are retained together as a single element.

* * * * *